(12) United States Patent
Baughman et al.

(10) Patent No.: US 9,542,646 B1
(45) Date of Patent: Jan. 10, 2017

(54) DRIFT ANNEALED TIME SERIES PREDICTION

(71) Applicant: INTERNATIONAL BUSINESS MACHINES CORPORATION, Armonk, NY (US)

(72) Inventors: Aaron Keith Baughman, Silver Spring, MD (US); Mauro Marzorati, Lutz, FL (US); Stefan Aloysius Gert Van der Stockt, Johannesburg (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/007,990

(22) Filed: Jan. 27, 2016

(51) Int. Cl.
  *G06N 3/12* (2006.01)
  *G06N 99/00* (2010.01)
(52) U.S. Cl.
  CPC ............ *G06N 3/126* (2013.01); *G06N 99/005* (2013.01)
(58) Field of Classification Search
  CPC .......... G06N 3/00; G06N 3/086; G06N 3/126; G06N 99/005
  USPC .......................................................... 706/13
  See application file for complete search history.

(56) References Cited

U.S. PATENT DOCUMENTS

| | | | |
|---|---|---|---|
| 6,247,122 B1 | 6/2001 | Henry et al. | |
| 6,571,331 B2 | 5/2003 | Henry et al. | |
| 7,149,590 B2 | 12/2006 | Martin et al. | |
| 8,364,613 B1 * | 1/2013 | Lin | G06N 7/005 700/65 |
| 2006/0217939 A1 * | 9/2006 | Nakata | G06F 17/18 702/189 |
| 2008/0071721 A1 * | 3/2008 | Wang | G06N 99/005 706/48 |
| 2009/0327206 A1 * | 12/2009 | MacLennan | G06F 17/18 706/59 |
| 2010/0076729 A1 | 3/2010 | Davis et al. | |

(Continued)

OTHER PUBLICATIONS

Baughman A. et al., "Predictive Cloud Computing with Big Data: Professional Golf and Tennis Forecasting", IEEE Computational intelligence magazine, Aug. 2015.*

(Continued)

*Primary Examiner* — Stanley K Hill
*Assistant Examiner* — Dave Misir
(74) *Attorney, Agent, or Firm* — Christopher K. McLane, Esq.; Hye Jin Lucy Song, Esq.

(57) ABSTRACT

Methods, computer program products, and systems are presented. The methods include, for instance: generating a drift annealed time series prediction model based on training data. In one embodiment the generating may include: recording an ensemble of candidate models for at least one predictor variable of the training data responsive to creating the ensemble based on the training data by machine learning. The ensemble includes three candidate models represented by respective prediction function to formulate a potentially predictive relationship between a target variable and predictor variables in the training data. Respective candidate models in the ensemble is manipulated to adjust degrees associated with predictor variables such that respective new models take relative importance of predictor variables into account and the drift annealed time series prediction model based on the new models is produced.

16 Claims, 19 Drawing Sheets

(56) References Cited

U.S. PATENT DOCUMENTS

| | | | |
|---|---|---|---|
| 2011/0112998 A1* | 5/2011 | Abe | G06N 5/003 |
| | | | 706/13 |
| 2011/0137837 A1* | 6/2011 | Kobayashi | G06T 5/002 |
| | | | 706/13 |
| 2012/0330719 A1 | 12/2012 | Malaviya et al. | |
| 2013/0231906 A1 | 9/2013 | Luvalle | |
| 2014/0065731 A1 | 3/2014 | Allenic et al. | |
| 2014/0067656 A1 | 3/2014 | Cohen Ganor et al. | |
| 2014/0136458 A1 | 5/2014 | Levin et al. | |
| 2016/0140584 A1* | 5/2016 | Moghtaderi | G06Q 30/0202 |
| | | | 705/7.31 |

OTHER PUBLICATIONS

Ozdemir et al., "Parameter Estimation in Multiple Linear Regression Models Using Ranked Set Sampling", pp. 7-20 (2007).

World Climate Research Programs, "Data and Bias Correction for Decadal Climate Predictions", CMIP-WGCM-WGSIP Decadal Climate Prediction Panel, International CLIVAR Project Office Publication Series 150, pp. 1-3 (2011).

D. P. Dee et al., "Bias and Data Assimilation", Global Modeling and Assimilation Office, NASA Goddard Space Flight Center, USA, 131, pp. 3323-3343 (2005).

Emery et al., "Enhanced Meteorological Modeling and Performance Evaluation for Two Texas Ozone Episodes", Environ International Corporation, Air Sciences, Final Report—Prepared for The Texas Natural Resource Conservation Commission, (Aug. 2001).

V. V. Kharin et al., "Statistical Adjustment of Decadal Predictions in a Changing Climate", Geophysical Research Letters, vol. 39, L19705 (2012).

Raviv et al., "Prediction Bias Correction for Dynamic Term Structure Models", Econometric Institute, Erasmus University Rotterdam Tinbergen Institute, (Feb. 4, 2015).

Volpi et al., "Comparison of Initialization methods in Global Dynamical Decadal Climate Forecasts", Poster for international workshop on seasonal to decadal prediction Toulouse, France, (May 2013).

Baseville et al., "On-Board Component Fault Detection and Isolation Using the Statistical Local Approach", presented at the 11th IFAC/IFORS Symposium on Identification and System Parameter Estimation SYSID '97, Kitakyushu, Japan (1997).

Edgar et al., "Automatic Control in Microelectronics Manufacturing: Practices, Challenges, and Possibilities", Survey paper, 2000 Elsevier Science Ltd. (1999).

Kotsiantis et al., "Machine Learning: A Review of Classification and Combining Techniques", Springer Science +Business Media B.V., pp. 159-188 (2007).

Neapolitan et al., "Probabilistic Methods for Bioinformatics with an Introduction to Bayesian Networks", Morgan Kaufmann Publishers (2009).

Vuduc et al., "Statistical Models for Empirical Search-Based Performance Tuning", International Journal of High Performance Computing Applications, vol. 18, No. 1 pp. 65-94 (Feb. 2004).

Belas et al., "Electromigration of Mobile Defects in CdTe", IEEE Transactions on Nuclear Science, vol. 56, No. 4, pp. 1752-1757 (Aug. 2009).

Li et al., "Mining Static Code Metrics for a Robust Prediction of Software Defect-Proneness", 2011 International Symposium on Empirical Software Engineering and Measurement, pp. 207-214 (2011).

Okumara et al., "Fast Migration of Plasma-Induced Defects in p-InP", 2001 International Conference on Indium Phosphide and Related Materials Conference Proceedings, Nara, Japan, pp. 260-263 (May 2001).

Shaneyfelt et al., "Field Dependence of Interface-Trap Buildup in Polysilicon and Metal Gate MOS Devices", IEEE Transactions on Nuclear Science, vol. 37, No. 6, pp. 1632-1640 (Dec. 1990).

Ulacha et al., "Improved Predictor Blending Technique for Lossless Image Coding", ICSES 2010—The International Conference on Signals and Electronic Systems, Gliwice, Poland, pp. 115-118 (Sep. 2015).

Young et al., "A Comparative Analysis of Schemes for Correlated Branch Prediction", Division of Applied Sciences, Harvard University, Proceedings of the 22nd Annual International Symposium on Computer Architecture, pp. 276-286 (Jun. 1995).

Sauerbrei et al., "Selection of important variables and determination of functional form for continuous predictors in multivariable model building", Wiley InterScience, Statistics in Medicine, pp. 5512-5528 (Oct. 2007).

Takeda et al., "On Generalization Performance and Non-Convex Optimization of Extended v-Support Vector Machine", New Generation Computing, vol. 27, No. 3, pp. 259-279 (May 2009).

Yamada et al., "Direct Importance Estimation with Gaussian Mixture Models", IEICE Transactions on Information and Systems, vol. E92-D, No. 10, pp. 2159-2162 (2009).

Sugiyama et al., "Direct Importance Estimation for Covariate Shift Adaptation", Annals of the Institute of Statistical Mathematics, vol. 60, No. 4, pp. 699-746 (2008).

* cited by examiner

EQ133

$$E(Y|\bar{x}_t) = \beta_1 x_{t1} + \beta_2 x_{t2} + \cdots + \beta_{|\bar{x}|} x_{t|\bar{x}|} + \varepsilon_1 + \cdots + \varepsilon_{|\bar{x}|}$$

$$= \sum_{1}^{|\bar{x}|} (\beta_i x_{ti} + \varepsilon_i)$$

EQ135

$$E(Y|\bar{x}_t) = \sum_{1}^{|\bar{x}|} (\beta_{i2} x_{ti}^2 + \beta_{i1} x_{ti} + \beta_{i0})$$

EQ137

$$E(Y|\bar{x}_t) = \sum_{1}^{|\bar{x}|} (\beta_{i3} x_{ti}^3 + \beta_{i2} x_{ti}^2 + \beta_{i1} x_{ti} + \beta_{i0})$$

EQ141

$$fw_{ft}(m) = 2^{-\frac{m}{h}}$$

$$\left| \frac{1}{\sum N} \sum_{i=1}^{N} d_i(N - (r_i - 1)) \right|$$

M1

$$E_f(Y|E_1(Y|\bar{x}_t), E_2(Y|\bar{x}_t)) = \sum_{1}^{|\bar{x}|} (\beta_{i2} x_{ti}^2 + \beta_{i1} x_{ti} + \beta_{i0})$$

M2

$$E(Y|\bar{x}_t) = \sum_{1}^{|\bar{x}|} (\beta_i x_{ti} + \varepsilon_i)$$

M3

$$E_c(Y|\bar{x}_t) = \alpha_1 E_f(Y|E_1(Y|\bar{x}_t), E_2(Y|\bar{x}_t)) + \alpha_2 E(Y|\bar{x}_t),$$
$$\alpha_1 + \alpha_2 = 1$$

M4

$$\left| \frac{1}{\sum_{i=j}^{N} r_i} \sum_{i=j}^{N} d_i(N - (r_i - 1)) \right|$$

FIG. 3B

```
401: linearModel<-lm(Label~HistoricalMatchFactorPipe
402: +HistoricalMatchFactorPipekurtosis
403: +HistoricalMatchFactorPipemean
404: +HistoricalMatchFactorPipenorm
405: +HistoricalMatchFactorPipeskew
406: +HistoricalMatchFactorPipesum
407: +MatchPlayFactorPipe
408: +TennisLogRealTimeFactorPipeacceleration
409: +TennisLogRealTimeFactorPipevelocity
410: +TennisTwitterCountFactorPipe
411: +TennisTwitterCountFactorPipeacceleration
412: +TennisTwitterCountFactorPipevelocity
413: +TwitterMatchFactorPipeaverage
414: +TwitterMatchFactorPipekurtosis
415: +TwitterMatchFactorPipemax
416: +TwitterMatchFactorPipeskew
417: +TwitterMatchFactorPipesum
418: +TennisLogRealTimeFactorPipecount, data=usta2013train)
```

FIG. 4A

```
431:    Multiple R-squared: 0.879,
432:    Adjusted R-squared: 0.879
433:    F-statistic: 6.02e+03 on 18 and 14911 DF,
434:    p-value: <2e-16
```

```
. . .
435: cv.lm(usta2013train,linearModel,4)
```

```
. . .
436:    Sum of squares = 1.53e+11
437:    Mean square = 41069254
438:    n = 3732
439:    6408 hits per minute, 18% from average label
```

```
. . .
441: linearModelPredict<-predict(linearModel,usta2013test)
442: mape=NULL
443: for (i in 1:length(linearModelPredict)){
444:        mape[i]<-abs((usta2013test$Label[i]-
                linearModelPredict[i])/usta2013test$Label[i])
445: }

. . .
446:    mean(mape)
447:    0.293
```

FIG. 4B

```
501: quadModel<-lm(Label~poly(HistoricalMatchFactorPipe,2,raw=TRUE)
502:   +poly(HistoricalMatchFactorPipekurtosis,2,raw=TRUE)
503:   +poly(HistoricalMatchFactorPipemean,2,raw=TRUE)
504:   +poly(HistoricalMatchFactorPipenorm,2,raw=TRUE)
505:   +poly(HistoricalMatchFactorPipeskew,2,raw=TRUE)
506:   +poly(HistoricalMatchFactorPipesum,2,raw=TRUE)
507:   +poly(MatchPlayFactorPipe,2,raw=TRUE)
508:   +poly(TennisLogRealTimeFactorPipecount,2,raw=TRUE)
509:   +poly(TennisLogRealTimeFactorPipeacceleration,2,raw=TRUE)
510:   +poly(TennisLogRealTimeFactorPipevelocity,2,raw=TRUE)
511:   +poly(TennisTwitterCountFactorPipe,2,raw=TRUE)
512:   +poly(TennisTwitterCountFactorPipeacceleration,2,raw=TRUE)
513:   +poly(TennisTwitterCountFactorPipevelocity,2,raw=TRUE)
514:   +poly(TwitterMatchFactorPipeaverage,2,raw=TRUE)
515:   +poly(TwitterMatchFactorPipekurtosis,2,raw=TRUE)
516:   +poly(TwitterMatchFactorPipemax,2,raw=TRUE)
517:   +poly(TwitterMatchFactorPipeskew,2,raw=TRUE)
518:   +poly(TwitterMatchFactorPipesum,2,raw=TRUE),
          data=usta2013train)
```

```
531:      Multiple R-squared: 0.937,
532:      Adjusted R-squared: 0.937
533:      F-statistic: 6.15e+03 on 36 and 14893 DF,
534:      p-value: <2e-16
535:      Sum of squares = 8.29e+10
536:      Mean square = 22219565
537:      n = 3732
538:      4713.76 hits per minute
539:      mean(mape)
540:      0.134
```

FIG. 5A

```
601: cubicModel<-
              lm(Label~poly(HistoricalMatchFactorPipe,3,raw=TRUE)
602:   +poly(HistoricalMatchFactorPipekurtosis,3,raw=TRUE)
603:   +poly(HistoricalMatchFactorPipemean,3,raw=TRUE)
604:   +poly(HistoricalMatchFactorPipenorm,3,raw=TRUE)
605:   +poly(HistoricalMatchFactorPipeskew,3,raw=TRUE)
606:   +poly(HistoricalMatchFactorPipesum,3,raw=TRUE)
607:   +poly(MatchPlayFactorPipe,3,raw=TRUE)
608:   +poly(TennisLogRealTimeFactorPipecount,3,raw=TRUE)
609:   +poly(TennisLogRealTimeFactorPipeacceleration,3,raw=TRUE)
610:   +poly(TennisLogRealTimeFactorPipevelocity,3,raw=TRUE)
611:   +poly(TennisTwitterCountFactorPipe,3,raw=TRUE)
612:   +poly(TennisTwitterCountFactorPipeacceleration,3,raw=TRUE)
613:   +poly(TennisTwitterCountFactorPipevelocity,3,raw=TRUE)
614:   +poly(TwitterMatchFactorPipeaverage,3,raw=TRUE)
615:   +poly(TwitterMatchFactorPipekurtosis,3,raw=TRUE)
616:   +poly(TwitterMatchFactorPipemax,3,raw=TRUE)
617:   +poly(TwitterMatchFactorPipeskew,3,raw=TRUE)
618:   +poly(TwitterMatchFactorPipesum,3,raw=TRUE),
                                  data=usta2013train)
```

```
631:      Multiple R-squared: 0.932,
632:      Adjusted R-squared: 0.932
633:      F-statistic: 4e+03 on 51 and 14878 DF,
634:      p-value: <2e-16
635:      Sum of squares = 9.15e+10
636:      Mean square = 24527851
637:      n = 3732
638:      mean(mape)
639:      0.148
```

FIG. 6A

```
     Linear ->
701: HistoricalMatchFactorPipe                   0.02812
702: HistoricalMatchFactorPipekurtosis           0.01902
703: HistoricalMatchFactorPipemean               0.01920
704: HistoricalMatchFactorPipenorm               0.04475
705: HistoricalMatchFactorPipeskew               0.04063
706: HistoricalMatchFactorPipesum                0.02874
707: MatchPlayFactorPipe                         0.03892
708: TennisLogRealTimeFactorPipeacceleration     0.00210
709: TennisLogRealTimeFactorPipevelocity         0.31312
710: TennisTwitterCountFactorPipe                0.01793
711: TennisTwitterCountFactorPipeacceleration    0.00231
712: TennisTwitterCountFactorPipevelocity        0.04767
713: TwitterMatchFactorPipeaverage               0.01051
714: TwitterMatchFactorPipekurtosis              0.01458
715: TwitterMatchFactorPipemax                   0.01097
716: TwitterMatchFactorPipeskew                  0.02949
717: TwitterMatchFactorPipesum                   0.00899
718: TennisLogRealTimeFactorPipecount            0.32297
```

FIG. 7A

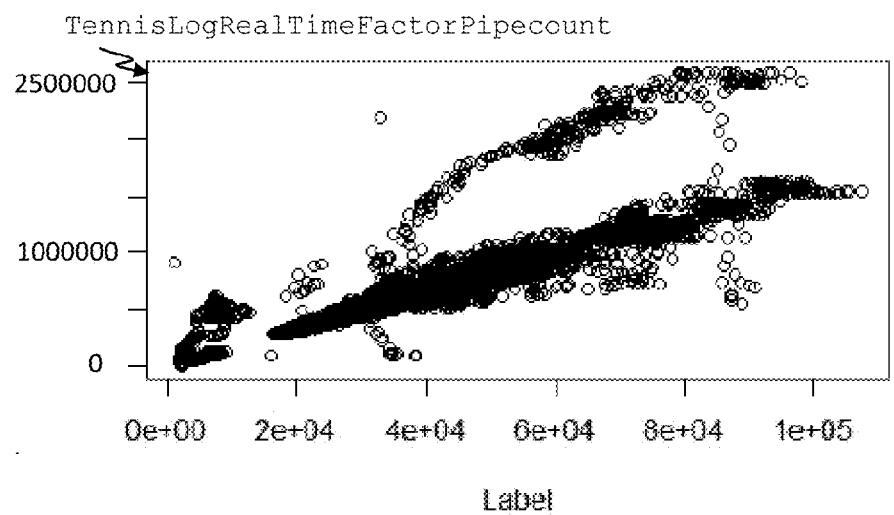

FIG. 7B

```
801: ggplot(usta2013train,
            aes(x=Label,y= TennisLogRealTimeFactorPipecount)) +
802: geom_point(size = 5) +
803: stat_smooth(method = "lm", formula = y~x,
            size = 1, se = FALSE, colour = "purple") +
804: stat_smooth(method = "lm", formula = y~I(1/x),
            size = 1, se = FALSE, colour = "blue") +
805: stat_smooth(method = "lm", formula = y~ log(x),
            size = 1, se = FALSE, colour = "yellow") +
806: stat_smooth(method = "nls",
            formula = y ~ I(1/x^a) + b*x, data=usta2013train,
            start = list(a=0,b=0), size = 1, se = FALSE,
            colour = "red") +
807: stat_smooth(method = "nls",
            formula = y ~ (a + b*log(x)), data=usta2013train,
            start =   setNames(coef(lm(
                TennisLogRealTimeFactorPipecount~log(Label),
                data=usta2013train)), c("a", "b")),
            size = 1, se = FALSE, colour = "green") +
808: stat_smooth(method = "nls",
            formula = y ~ I(1/x^a)+b, data=usta2013train,
            start = list(a=0,b=0), size = 1, se = FALSE,
            colour = "orange")
```

FIG. 8A

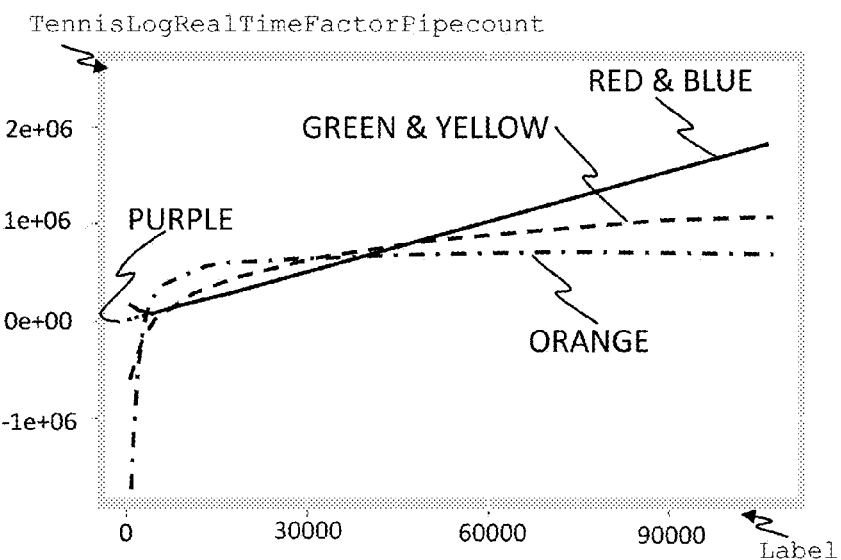

FIG. 8B

```
811: models <- list(
812: lm(y~x, data = dat),
813: lm(y~I(1/x), data=dat),
814: lm(y ~ log(x), data = dat),
815: nls(y ~ I(1/x*a) + b*x, data = dat,
816:     start = list(a = 1, b = 1)),
817: nls(y ~ (a + b*log(x)), data=dat,
818:     start = setNames(coef(lm(y ~ log(x), data=dat)),
819:                      c("a", "b"))),
820: nls(y ~ I(exp(1)^(a + b * x)), data=dat,
821:     start = list(a=0,b=0)),
822: nls(y ~ I(1/x*a)+b, data=dat,
823:     start = list(a=1,b=1)))

825: library(AICcmodavg); library(plyr); library(stringr)
826: ldply(models,
827:     function(mod){ data.frame(AICc = AICc(mod),
828:                               AIC = AIC(mod),
829:                               model = deparse(formula(mod))) })
```

FIG. 8C

```
        AICc       AIC        model
831: 400782.5   400782.5   TennisLogRealTimeFactorPipecount ~
                                     Label
832: 420247.1   420247.1   TennisLogRealTimeFactorPipecount ~
                                     I(1/Label)
833: 412022.1   412022.1   TennisLogRealTimeFactorPipecount ~
                                     log(Label)
834: 400714.3   400714.3   TennisLogRealTimeFactorPipecount ~
                                     I(1/Label * a) + b * Label
835: 412022.1   412022.1   TennisLogRealTimeFactorPipecount ~
                                     (a + b * log(Label))
836: 420247.1   420247.1   TennisLogRealTimeFactorPipecount ~
                                     I(1/Label * a) + b
837: 400226.9   400826.9   TennisLogRealTimeFactorPipecount ~
                                     poly(Label, 3, raw = TRUE)
838: 400402.9   400902.9   TennisLogRealTimeFactorPipecount ~
                                     poly(Label, 2, raw = TRUE)
```

DRIFT ANNEALED TIME SERIES PREDICTION

TECHNICAL FIELD

The present disclosure relates to predictive analytics and machine learning, and more particularly to methods, computer program products, and systems for prolonging accuracy of a time series forecasting model.

BACKGROUND

Traditional forecasting on time series is modeled by use of training data, which have been collected from occurrences in the past, based on various degrees of predictor functions. The training data include one or more independent predictor variables and at least one dependent variable determined as a predictor function of the one or more independent predictor variables, such that resulting time series forecasting models are enabled to estimate an unknown dependent variable from the one or more dependent predictor variables. Based on the degrees of the predictor functions, the time series forecasting models may be, but are not limited to, a linear curve regression model, a quadratic regression model, or a cubic regression model that displays respective characteristics in forecasting and varying accuracies. Many automated statistical software packages and programming languages, such as R, S, SAS® software, SPSS®, Minitab®, etc., are available for time series forecasting. (SAS is a registered trademark of SAS Institute Inc., Cary, N.C., USA; SPSS is a registered trademark of International Business Machines Corporation, Armonk, N.Y., USA; Minitab is a registered trademark of Minitab, Inc., in the United States and other countries.)

SUMMARY

The shortcomings of the prior art are overcome, and additional advantages are provided, through the provision, in one aspect, of a method. The method for generating a drift annealed time series prediction model based on training data includes, for example: recording an ensemble of candidate models for at least one predictor variable of the training data, in a memory of a computer, responsive to creating the ensemble based on the training data, the ensemble comprising a first candidate model, a second candidate model, and a third candidate model, wherein the first candidate model is represented by a linear prediction function, the second candidate model is represented by a quadratic prediction function, and the third candidate model is represented by a cubic prediction function, and wherein the linear prediction function is for long-term forecasting, the quadratic prediction function is for mid-term forecasting, and the cubic prediction function is for short-term forecasting, and wherein the training data comprises instances of said at least one predictor variable and a target variable having a potentially predictive relationship with said at least one predictor variable; recording a new ensemble of new models, in the memory, responsive to creating the new ensemble comprising a first new model, a second new model, and a third new model, wherein the respective new models result from calculating respective new degrees for each candidate model of the ensemble such that respective new models take relative importance of predictor variables into account; instantiating the drift annealed time series prediction model with the recorded new ensemble; and sending, to an output device of the computer, the drift annealed time series prediction model, such that the drift annealed time series prediction model is utilized for forecasting accurately in the future without drifts.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A and 3B list equations used for element modeling and combining individual models in the flowcharts FIGS. 2A, 2B and 2C by the prediction modeling engine, in accordance with one or more embodiments set forth herein;

FIGS. 4A, 4B and 4C depict an example of a linear prediction model of the prediction model ensemble, in accordance with one or more embodiments set forth herein.

FIGS. 5A and 5B are an example of a quadratic prediction model of the prediction model ensemble, in accordance with one or more embodiments set forth herein;

FIGS. 6A and 6B are an example of a cubic prediction model of the prediction model ensemble, in accordance with one or more embodiments set forth herein;

FIG. 7A is an exemplary ranking of 18 predictors in the example of FIGS. 4A, 4B, 4C, 5A, 5B, 6A, and 6B, resulting from block 294 for the linear model, in accordance with one or more embodiments set forth herein;

FIG. 7B depicts graphical distribution of the top predictor TennisLogRealTimeFactorPipecount, as presented from the exemplary ranking of FIG. 7A, in accordance with one or more embodiments set forth herein;

FIG. 8A is a listing for curve fitting utilizing various functions for the top ranked predictor TennisLogRealTimeFactorPipecount, in accordance with one or more embodiments set forth herein;

FIG. 8B depicts various curves resulting from the curve fitting of FIG. 8A for the top predictor, in accordance with one or more embodiments set forth herein;

FIG. 8C is an exemplary listing for AIC calculation, in accordance with one or more embodiments set forth herein;

FIG. 8D depicts a result from listing of FIG. 8C, in accordance with one or more embodiments set forth herein;

DETAILED DESCRIPTION

Figure 1:
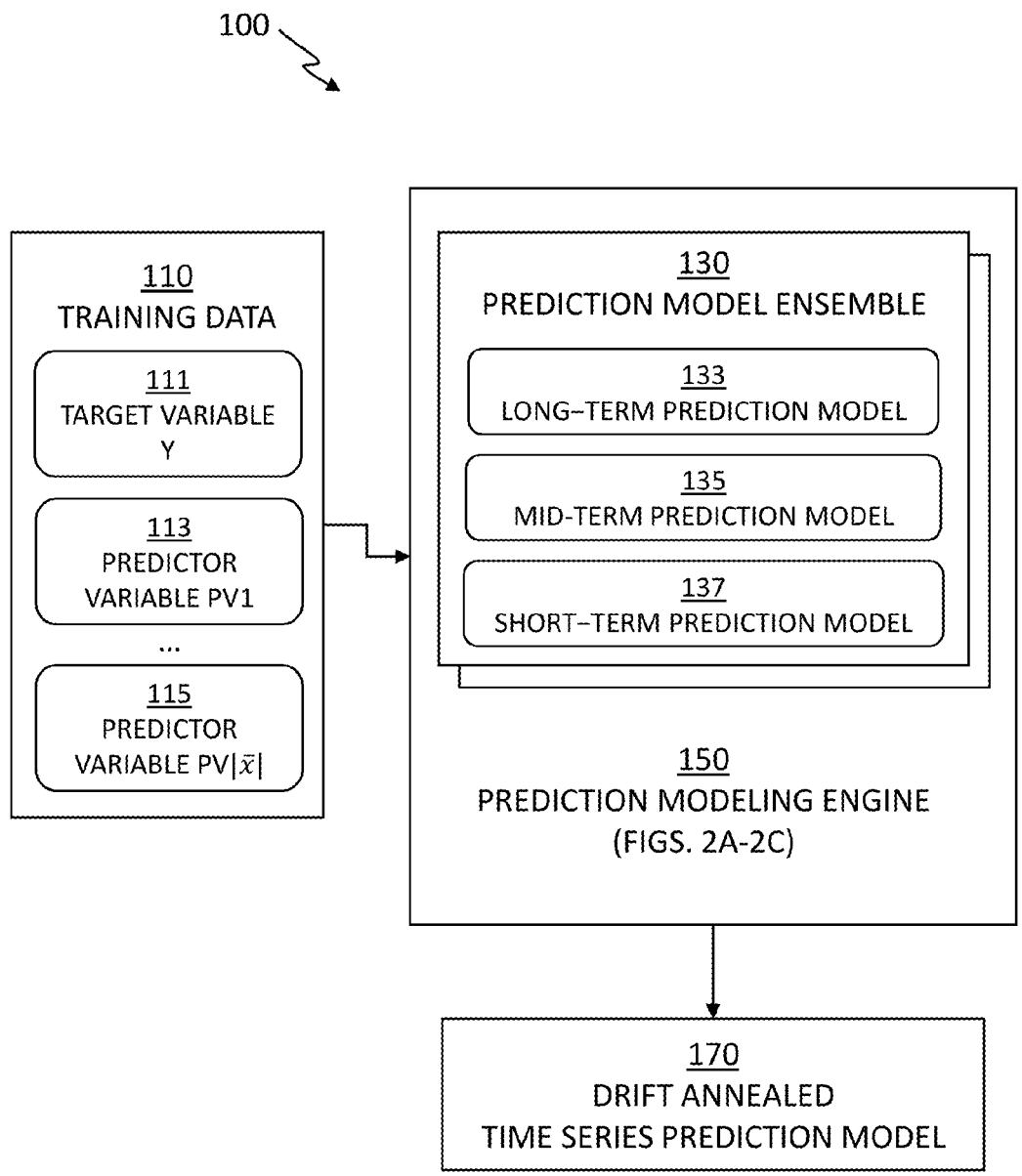
FIG. 1 depicts a drift annealing time series prediction system, in accordance with one or more embodiments set forth herein.

FIG. 1 depicts a drift annealing time series prediction system 100, in accordance with one or more embodiments set forth herein.

The drift annealing time series prediction system 100 includes a prediction modeling engine 150 using training data 110 as input and generates a drift annealed time series prediction model 170.

The training data 110 includes at least one set of data {Y, X}, where a target variable Y 111 is determined as a function H of predictor variables X 113, ..., 115, that is Y=H(X), and where X includes $|\bar{x}|$ number of predictor variables from a first predictor variable PV1 113 through $|\bar{x}|$-th predictor variable PV$|\bar{x}|$ 115. In time series modeling, the function H, where H may be any polynomial function determining the target variable Y dependent on independent predictor variable X, is learned based on the training data 110.

The prediction modeling engine 150 generates a prediction model ensemble 130 of one or more prediction model ensembles by use of the training data 110 in the process of generating the drift annealed time series prediction model 170. The prediction model ensemble 130 includes a long-term prediction model 133, a mid-term prediction model 135, and a short-term prediction model 137. The prediction modeling engine 150 further processes and/or combines elements of the prediction model ensemble 130 in generating the drift annealed time series prediction model 170. See descriptions of FIGS. 2A, 2B, and 2C for detailed processes of the prediction modeling engine 150 building the drift annealed time series prediction model 170. See descriptions of FIGS. 4A, 4B, 4C, 5A, 5B, 6A, and 6B for an example of the prediction model ensemble 130.

In one embodiment of the present invention, the long-term prediction model 133 is designed to predict for 200 hours into the future, the mid-term prediction model 135 is designed to predict for 20 hours into the future, and the short-term prediction model 137 is designed to predict for 2 hours into the future. All three models 133, 135, and 137 are built on the same training data 110, and each model yields respective accuracies. In the same embodiment of the present invention, the drift annealed time series prediction model 170 is an ensemble.

The drift annealed time series prediction model 170 resolves issues of a model drift in conventional time series modeling regarding environmental changes intervening between the time of building a time series model and the time of forecasting by use of the time series model established in the past. As a consequence of the model drift, the time series model may not be useful to predict in other environment without learning the environmental changes. For example, if the time series model was built using tennis tournament data, the time series model may not produce equally effective predictions on golf tournaments. Conventional time series modeling attempts to deal with the model drift by techniques such as online learning of the environmental changes by the time series model, retraining of an off-line time series model where online learning is not available, and/or switching into a new time series model, etc. These techniques may not be available in operating the time series model due to technical, environmental, and/or budgetary concerns, and especially, making a new time series model to adapt to environmental changes is too expensive from computational cost and human resource perspectives.

The drift annealed time series prediction model 170 is established with a preference for a linear regression fit, based on the observation that in many time series models, although a short-term, cubic regression fit may be more accurate than a linear regression fit, the most important predictor variables are related to target variables by a linear relationships. This linear trend of environmental changes implies that the drift annealed time series prediction model 170 based on the linear regression fit may predict target variables as effectively in other environments as in the environment from which the training data 110 had been acquired, thus the model drift would be slower and/or annealed. The drift annealed time series prediction model 170 further reflects relative importance of changes in respective predictor variables, and obtained after statistical 4-fold cross validation and regression trends comparison by use of the Akaike Information Criterion (AIC) values amongst candidate models. In one embodiment of the present invention, the drift annealed time series prediction model 170 includes an ensemble of at least one time series prediction model, an ordinal ranking of predictor variables in one of time series prediction model, and a best-fit model for respective predictor variables listed in the ordinal ranking. In this specification, terms "linear regression" and "linear curve regression" are used interchangeably. Similarly, terms "quadratic regression" and "quadratic curve regression" are used interchangeably.

Figure 2A:
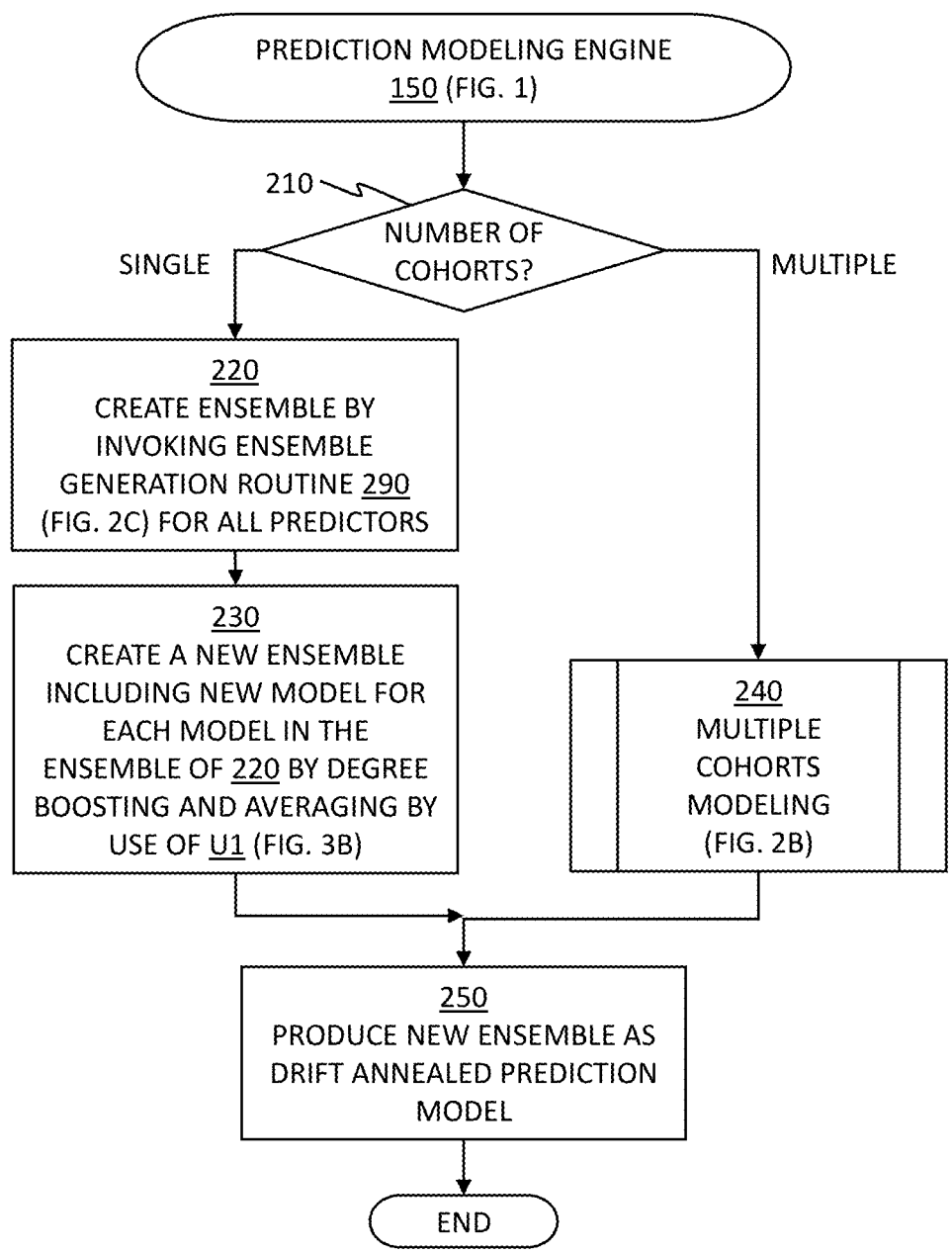
FIGS. 2A, 2B and 2C depict flowcharts for the prediction modeling engine of the drift annealing time series prediction system of FIG. 1, in accordance with one or more embodiments set forth herein.
Figure 2B:
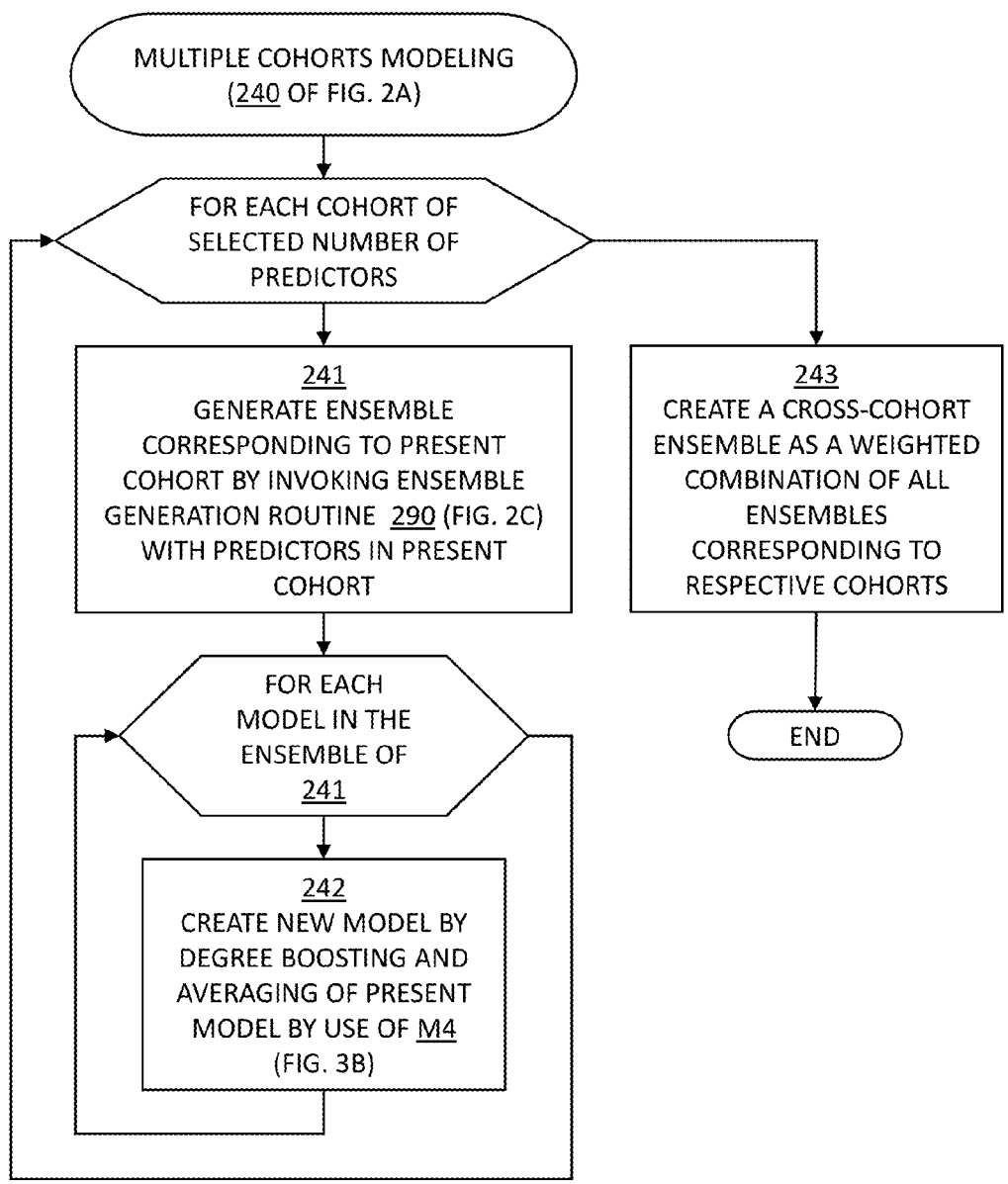
Figure 2C:
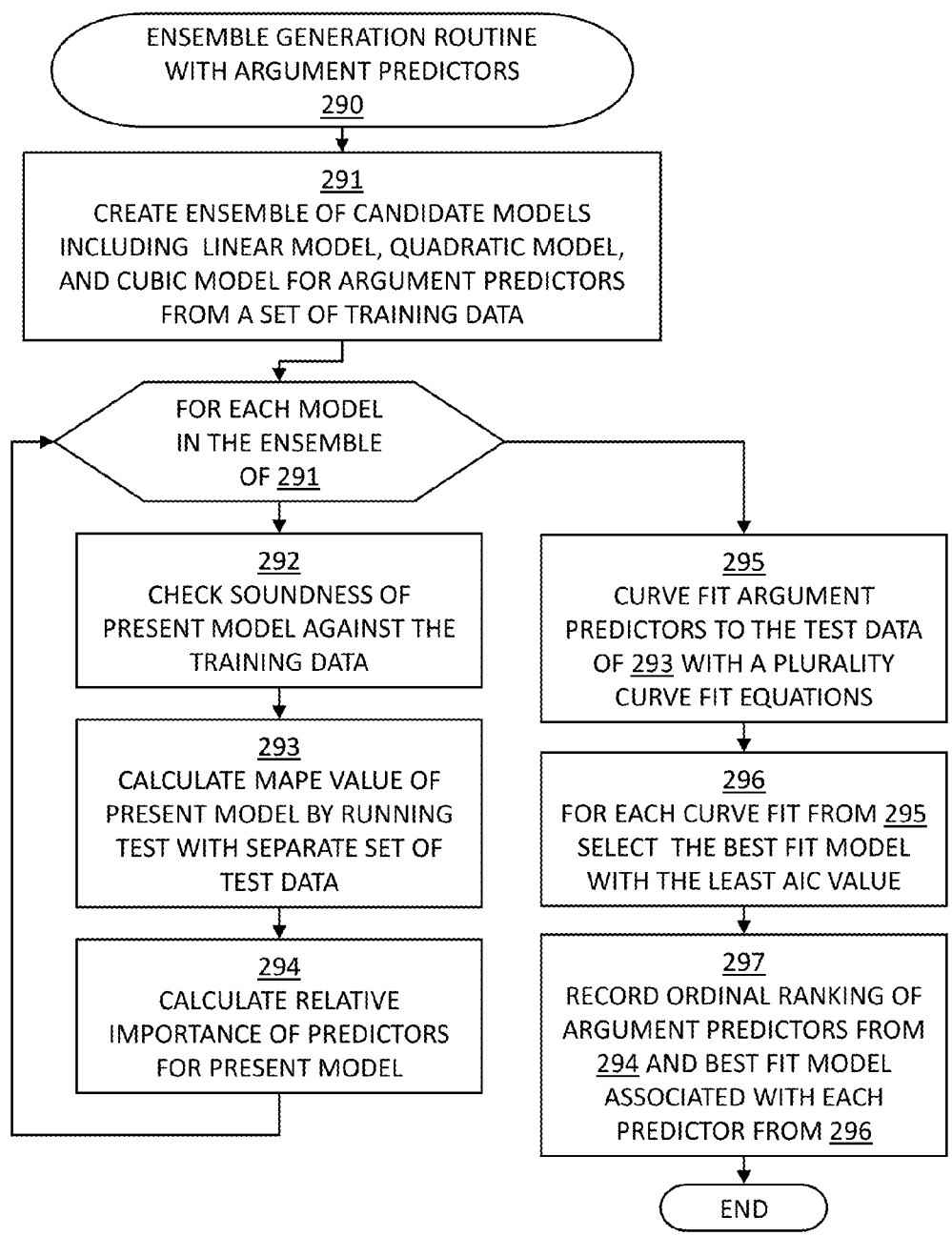

FIGS. 2A, 2B and 2C depict flowcharts for the prediction modeling engine 150 of the drift annealing time series prediction system 100 of FIG. 1, in accordance with one or more embodiments set forth herein.

FIG. 2A depicts a top level flowchart for the prediction modeling engine 150 of the drift annealing time series prediction system 100 of FIG. 1, in accordance with one or more embodiments set forth herein.

In block 210, the prediction modeling engine 150 determines whether or not to divide the predictor variables into more than one cohort for modeling. The decision of block 210 may be prompted to a human analyst for an input, or predetermined and fed to the prediction modeling engine as data. If the prediction modeling engine determines to use the predictor variables as a single cohort for the prediction modeling, then the prediction modeling engine proceeds with block 220. If the prediction modeling engine determines to divide the predictor variables into two or more groups, referred to as cohorts, for the prediction modeling, then the prediction modeling engine proceeds with block 240.

In block 220, the prediction modeling engine 150 creates a prediction model ensemble by invoking an ensemble generation routine 290 of FIG. 2C for all predictor variables in the training data, as the prediction modeling engine models the training data as a single cohort. See description of FIG. 2C for details of the ensemble generation routine. As a result, the prediction modeling engine creates the prediction model ensemble having a long-term prediction model, a mid-term prediction model, and a short-term prediction model for all predictor variables, as well as ordinal rankings for all predictor variables for each model in the prediction model ensemble. Then the prediction modeling engine proceeds with block 230.

In block 230, the prediction modeling engine 150 creates a new ensemble including respective new models for the long-term prediction model, the mid-term prediction model, and the short-term prediction model of the prediction model ensemble from block 220, with respective new degrees calculated by boosting degrees of each function according to Equation U1 of FIG. 3B. See description of FIG. 3B for details of Equation U1. Then the prediction modeling engine proceeds with block 250.

In block 240, the prediction modeling engine 150 invokes a multiple cohorts modeling process of FIG. 2B, which produces a new ensemble of new models for multiple cohorts by separately modeling each cohort and then by combining partial models separately modeled for each cohort. See description of FIG. 2B for details of the multiple cohorts modeling process. Then the prediction modeling engine proceeds with block 250.

In block 250, the prediction modeling engine 150 produces the new ensemble generated in either block 230 or block 240 as a drift annealed time series prediction model 170 of FIG. 1. Then the prediction modeling engine terminates.

FIG. 2B depicts a detailed flowchart for block 240 of FIG. 2A, wherein the prediction modeling engine 150 performs the multivariate cohort modeling, in accordance with one or more embodiments set forth herein.

In preparation of block 241, the prediction modeling engine 150 divides the predictor variables into a predefined number of cohorts. Each predictor variables belong to only one cohort of the predefined number of cohorts.

In block 241, the prediction modeling engine 150 generates an ensemble for each cohort including respectively selected number of predictor variables, by invoking the ensemble generation routine 290 of FIG. 2C for the predictor variables belonging to each cohort. See description of FIG. 2C for details of the ensemble generation routine. Then the prediction modeling engine 150 proceeds with block 242 for each prediction model in the ensemble.

In block 242, the prediction modeling engine 150 creates a new model for each prediction model in the ensemble from block 241, by boosting, according to Equation M4 of FIG. 3B, and/or averaging degrees of respective predictor function, of each prediction model in the ensemble. See description of FIG. 3B for equations for boosting degrees of predictor functions in case of multiple cohorts. When the prediction modeling engine 150 creates respective new models for all ensembles corresponding to each cohort, then the prediction modeling engine proceeds with block 243.

In block 243, the prediction modeling engine 150 creates a cross-cohort ensemble as a weighted combination of respective models from all ensembles corresponding to respective cohorts. Then the prediction modeling engine 150 concludes the multiple cohorts modeling and proceeds with block 250 of FIG. 2A.

In one embodiment of the present invention, the prediction modeling engine 150 determines to model five (5) predictor variables into two (2) cohorts, including a first cohort and a second cohort. In the same embodiment, the prediction modeling engine selects two (2) predictor variables of rank 1 and rank 2 for the first cohort. Accordingly, the rest of three (3) predictor variables of rank 3, rank 4, and rank 5, respectively, belong to the second cohort. A first ensemble for the first cohort includes a first long-term prediction model, a first mid-term prediction model, and a first short-term prediction model, after the prediction modeling engine performs block 241, respectively for predictor variables in rank 1 and rank 2. Subsequently the prediction modeling engine creates respective new models of the first ensemble from block 241, resulting in a first new long-term model, a first new mid-term model, and a first new short-term model, by executing block 242 three times for each prediction model in the first ensemble. When the prediction modeling engine finished creating new models for the first cohort including the predictor variables in rank 1 and rank 2, the prediction modeling engine loops back to block 241 for the second cohort including predictor variables in rank 3, rank 4, and rank 5. Similar to the first ensemble, the prediction modeling engine performs block 241 for the second cohort, resulting in a second ensemble for the second cohort including a second long-term prediction model, a second mid-term prediction model, and a second short-term prediction model. Proceeding to block 242 for each prediction model of the second ensemble, the prediction modeling engine creates a second new long-term model, a second new mid-term model, and a second new short-term model, by executing block 242 three times for each prediction model in the second ensemble. When the prediction modeling engine finished creating new element models for the second cohort, as there is no more cohort to model, the prediction modeling engine proceeds with block 243 to create a new ensemble, based on the first ensemble and the second ensemble. In the same embodiment, a component prediction model for a multivariate cohort may be represented as $E_f$ in Equation M1 of FIG. 3B. A component prediction model for a univariate cohort may be represented as E in Equation M2 of FIG. 3B, and a weighted combination of respective models from the first ensemble and the second ensemble may be generated according to Equation M3 of FIG. 3B. See description of FIG. 3B for details of equations M1, M2, and M3.

FIG. 2C depicts a flowchart for an ensemble generation routine 290 for argument predictors, invoked from blocks 220 of FIG. 2A, and blocks 241, 243 of FIG. 2B, in accordance with one or more embodiments set forth herein.

In block 291, the prediction modeling engine 150 generates an ensemble of a linear model, a quadratic model, and a cubic model for predictor variables provided as arguments from a set of training data. The linear model according to equation EQ133 of FIG. 3A is for long-term prediction, the quadratic model according to equation EQ135 of FIG. 3A is for mid-term prediction, and the cubic model according to equation EQ137 of FIG. 3A is for short-term prediction. See FIGS. 4A, 5A and 6A, for exemplary listings for creating the linear model, the quadratic model, and the cubic model, respectively, in block 291. Then the prediction modeling engine 150 performs blocks 292 through 294 as a unit for each model of the ensemble, which will be referred to as a present model hereinafter in the description of FIG. 2C.

In block 292, the prediction modeling engine 150 checks soundness of the present model is by calculating $R^2$, by running F-test, and by running a cross validation of the present model with the training data. The coefficient of determination, $R^2$ or $r^2$, pronounced R squared, indicates how well the training data fit the present model, wherein $0 \leq R^2 \leq 1$, $R^2=1$ indicates that the present model perfectly fits the training data, $R^2=0$ indicates that the present model does not fit the training data at all, because the training data is not suitable for modeling. The F-test is another statistical fitting test often used to identify a model that best fits a sampling domain of the training data, calculated as $$F = \frac{\text{explained variance}}{\text{unexplained variance}}$$

Figure 4C:
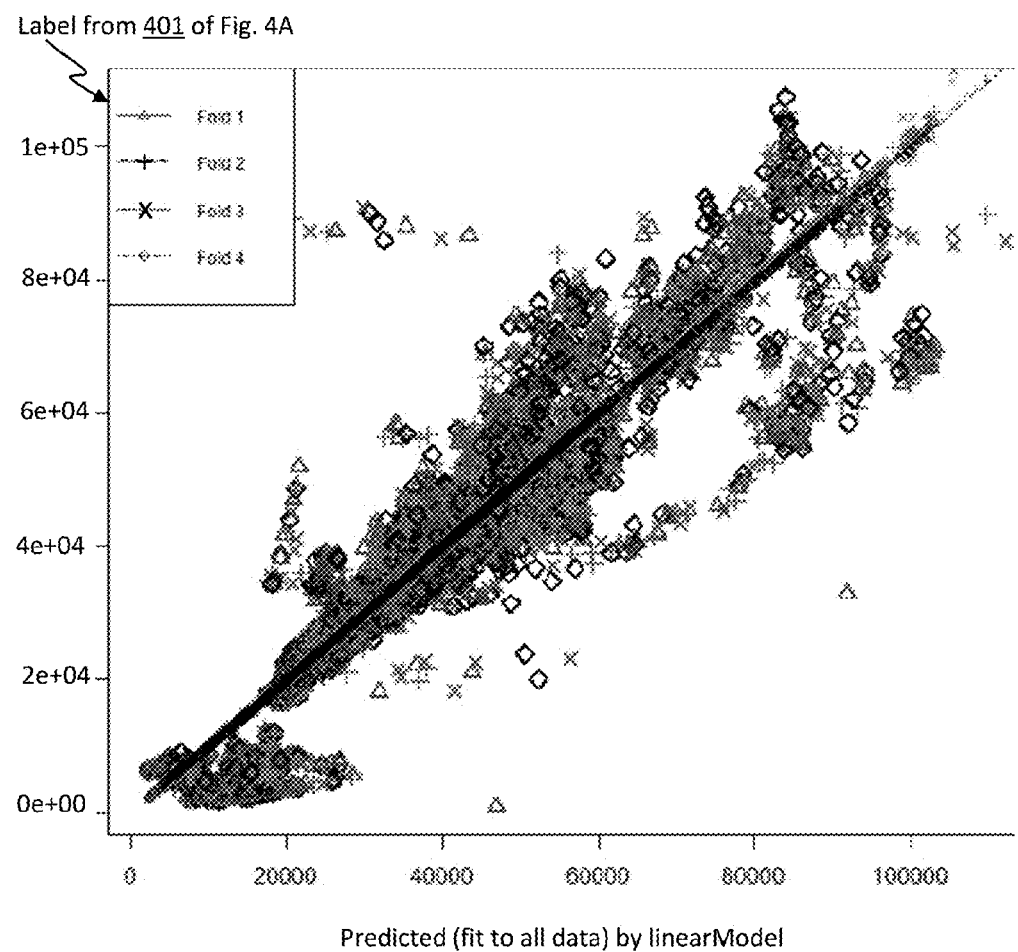
Figure 5B:
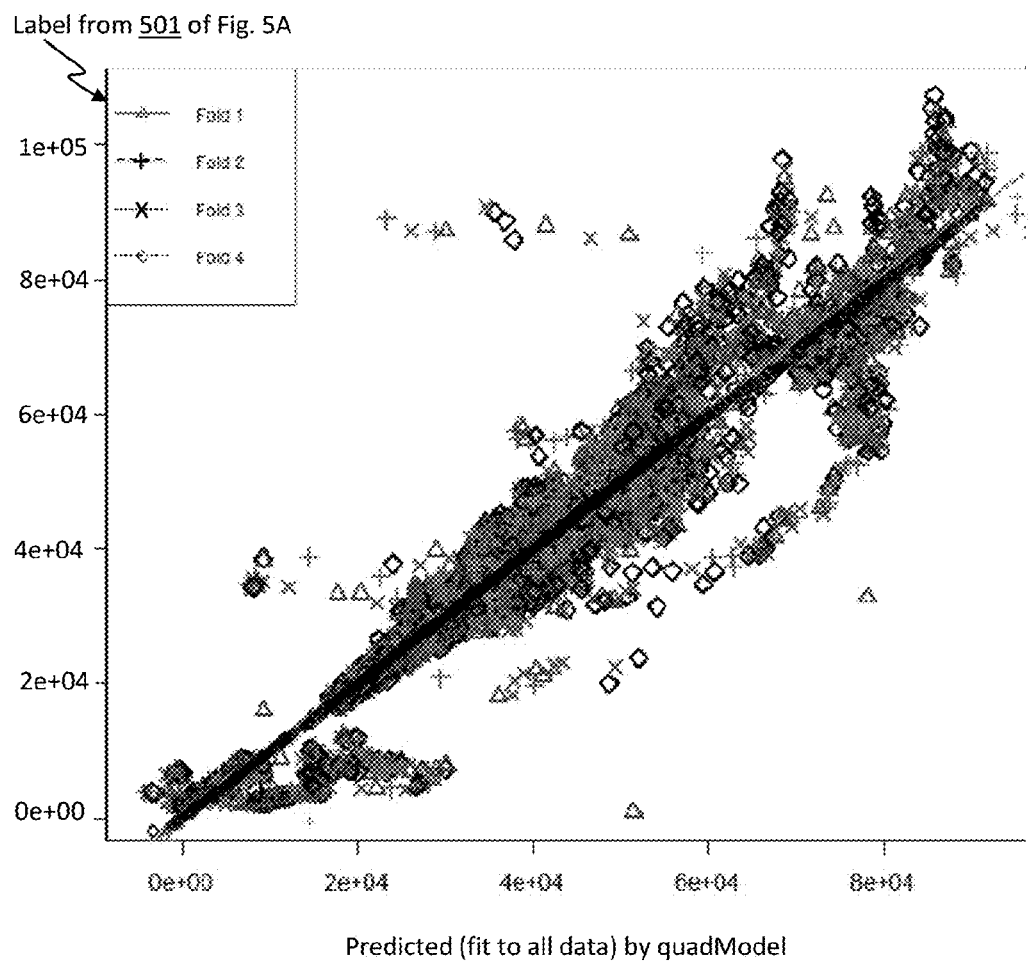
Figure 6B:
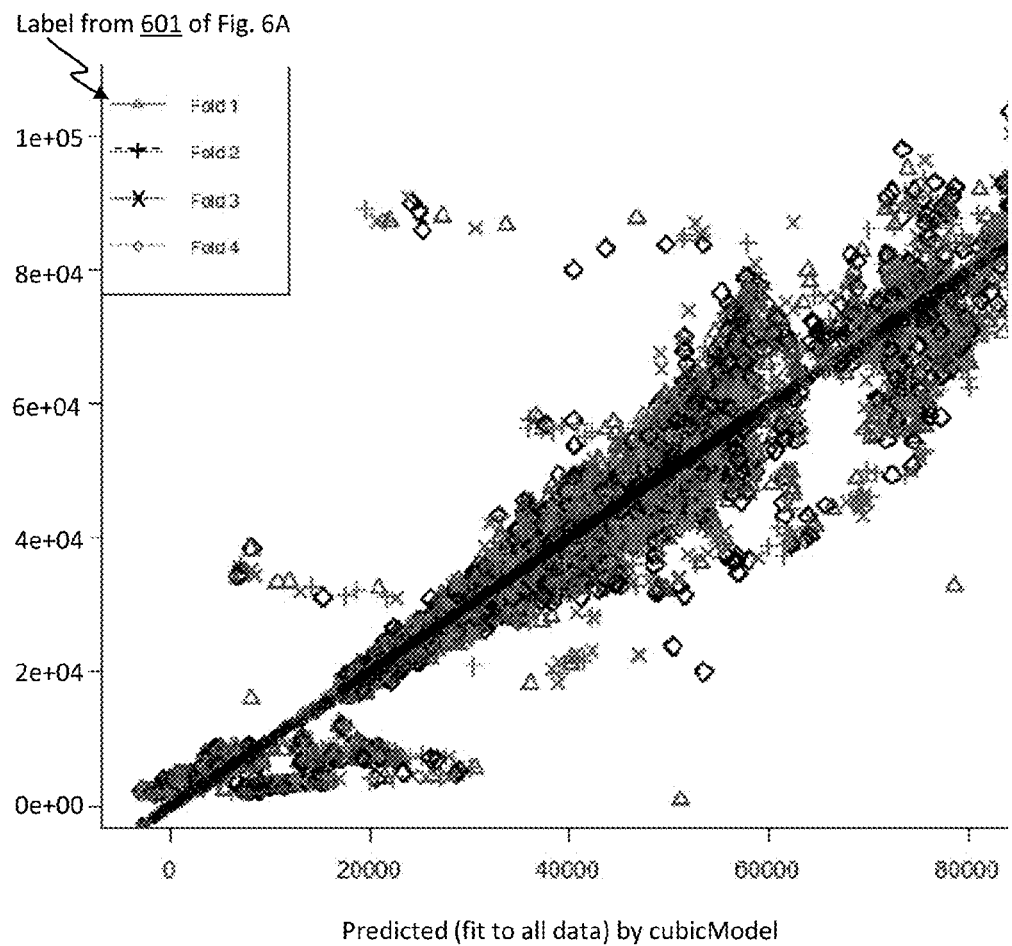

See FIGS. 4B, 5A and 6A, for exemplary results of block 292 for the linear model, the quadratic model, and the cubic model, respectively, of the ensemble from block 291. See FIGS. 4C, 5B and 6B, for exemplary results of k-fold cross validation, wherein k=4, for the linear model, the quadratic model, and the cubic model, respectively. Then the prediction modeling engine proceeds with block 293.

In block 293, the prediction modeling engine 150 calculates Mean Absolute Percent Error (MAPE) value of the present model by running test with a separate set of test data. See FIGS. 4B, 5A and 6A, for exemplary results of block 293 for the linear model, the quadratic model, and the cubic model, respectively. Then the prediction modeling engine proceeds with block 294.

In block 294, the prediction modeling engine 150 calculates relative importance associated with each predictor variable of the argument predictor variables for the present model. In one embodiment of the present invention, respective relative importance of each predictor variable, in any polynomial model, is calculated by first calculating z-score of each predictor variable, and then running lmg( ) function in R package, where z-score indicates a statistical measurement of a relationship of a predictor variable to the mean in a group of predictor variables, and where lmg( ) function averaging sequential sums of squares over all orderings of predictor variables, proposed by Lindeman, Merenda, and Gold is a selected method for calculating the relative importance of predictor variables. See FIG. 7A for an exemplary ranking of relative importance for the predictors variables resulting from block 294, in case of the linear model. Then the prediction modeling engine either loops back to block 292 to process a next model in the ensemble. If the prediction modeling engine performed blocks 292 through 294 for all models in the ensemble, then the prediction modeling engine proceeds with block 295.

In block 295, the prediction modeling engine 150 perform curve fit each predictor variable of argument predictor variables to the separate set of test data from block 293 by use of numerous preselected curve fit equations. See FIGS. 8A and 8B for an exemplary listing for curve fitting and a graph resulting from the curve fitting performed in block 295. Then the prediction modeling engine proceeds with block 296.

In block 296, the prediction modeling engine 150 selects a best-fit model having the least Akaike Information Criterion (AIC) value for each curve fit from block 295, each best-fit model associated with each predictor variable of argument predictor variables. See FIGS. 8C and 8D for an exemplary result of an AIC ranking calculated from block 296. Then the prediction modeling engine proceeds with block 297.

In block 297, the prediction modeling engine 150 returns, to a block invoked the ensemble generation routine, an ordinal ranking of argument predictor variables, as calculated in relative importance from block 294, and the best-fit model selected from block 296, for each predictor variable of argument predictor variables.

In block 297, the prediction modeling engine 150 records an ordinal ranking of argument predictor variables, as calculated in relative importance from block 294, and the best-fit model selected from block 296, for each predictor variable of argument predictor variables such that the block invoked the ensemble generation routine, also referred to as a caller, either block 210 of FIG. 2A or block 241 of FIG. 2B, may access the ordinal ranking of the predictor variables in the present model and the best-fit models corresponding to respective predictor variables for the present model as well as all other data created by the ensemble generation routine. If the prediction modeling engine had performed blocks 292 through 297 for all models in the ensemble, then the prediction modeling engine concludes the ensemble generation routine and proceeds with a next block in the caller.

FIG. 3A lists equations used for generating a prediction model ensemble and a drift annealed time series prediction model 170 of FIG. 1 as in the flowcharts FIGS. 2A and 2C by the prediction modeling engine 150, in accordance with one or more embodiments set forth herein.

Equation EQ133 is a linear curve regression model of a dependent variable Y, represented as $E(Y|\bar{x}_t)$, that is determined as a sum of linear predictor functions of an independent predictor variable $\bar{x}_t$ and respective noise. There are $|\bar{x}|$ number of predictor variables in a time series t, thus each predictor variable is represented as $x_{ti}$, i=1, ..., $|\bar{x}|$. A first term $\beta_i x_{ti}$ is an inner product between the predictor variable vector $x_{ti}$ and respective coefficient vector $\beta_i$. A second term $\epsilon_i$ is an error term, or noise, vector. Consequently, the dependent variable Y is also a vector.

Equation EQ135 is a quadratic curve regression model of a dependent variable Y, represented as $E(Y|\bar{x}_t)$, that is determined as a sum of quadratic predictor functions of an independent predictor variable $\bar{x}_t$ and respective noise. There are $|\bar{x}|$ number of predictor variables in a time series t, thus each predictor variable is represented as $x_{ti}$, i=1, ..., $|\bar{x}|$. A first term $\beta_{i2} x_{ti}^2$ is the inner product between the square of the predictor variable $x_{ti}^2$ and a coefficient vector $\beta_{i2}$ corresponding to $x_{ti}^2$, a second term $\beta_{i1} x_{ti}$ is the inner product between the predictor variable $x_{ti}$ and a coefficient vector $\beta_{i1}$ corresponding to $x_{ti}$, and $\beta_{i0}$ is a constant coefficient vector. As in Equation EQ133, all terms of EQ135 are respective vectors.

Equation EQ137 is a cubic regression model of a dependent variable Y, represented as $E(Y|\bar{x}_t)$, that is determined as a sum of cubic predictor functions of an independent predictor variable $\bar{x}_t$ and respective noise. There are $|\bar{x}|$ number of predictor variables in a time series t, thus each predictor variable is represented as $x_{ti}$, i=1, ..., $|\bar{x}|$. A first term $\beta_{i3} x_{ti}^3$ is the inner product between the third power of the predictor variable $x_{ti}^3$ and a coefficient vector $\beta_{i3}$ corresponding to $x_{ti}^3$, a second term $\beta_{i2} x_{ti}^2$ is the inner product between the square of the predictor variable $x_{ti}^2$ and a coefficient vector $\beta_{i2}$ corresponding to $x_{ti}^2$, a third term $\beta_{i1} x_{ti}$ is the inner product between the predictor variable $x_{ti}$ and a coefficient vector $\beta_{i1}$ corresponding to $x_{ti}$, and $\beta_{i0}$ is a constant coefficient vector. As in Equations EQ133 and EQ135, all terms of EQ137 are respective vectors.

Commonly in equations EQ133, EQ135, and EQ137, $\beta$ is a coefficient vector referred to as effects, or regression coefficient obtained from the training data. Initial machine learning rounds with the training data, not presented in this specification, are run to obtain the coefficient vectors $\beta$.

Equation EQ141 of FIG. 3A is for a half-life calculation for a weight of a predictor variable, wherein m indicates minutes into the future that the drift annealed time series prediction model 170 of FIG. 1 is forecasting, and h indicates the midpoint, in minutes, between a maximum forecast time and a present time. A result of Equation EQ141 produces a decayed weight w, $0 \leq w \leq 1$. In another embodiment of the present invention, a respective weight for each predictor variable for each model may be first calculated according to equation EQ141 of FIG. 3A, to reflect decaying importance over time, such that an ensemble of the drift annealed time series prediction model 170 of FIG. 1 may be rendered as a single prediction model instead of an ensemble. In the same embodiment, the prediction modeling engine normalizes all calculated weights corresponding to all predictor variables such that the weights are relative to each other. Then, relative contribution of respective predictor variables are calculated as the normalized weight of each predictor variable divided by a sum of all weights for predictor variables, in the single prediction model of the drift annealed time series prediction model 170 of FIG. 1.

FIG. 3B lists equations used for model tuning for a univariate cohort and a multivariate cohort as in the flowcharts FIGS. 2A and 2B by for the prediction modeling engine, in accordance with one or more embodiments set forth herein;

Equation U1 of FIG. 3B shows how to calculate a new degree of predictor function as an average of degrees boosted by rank of each predictor variable, resulting from a mathematical floor for a sum of $d_i(N-(r_i-1))$ divided by a sum of N, wherein $d_i$ indicates a degree of a polynomial for a predictor function associated with an i-th predictor variable, N indicates a total number of predictor variables, $r_i$ indicates a rank of i-th predictor variable.

For example, an ensemble includes three base models of a long-term model, a mid-term model, and a short-term model. In the ensemble, five (5) most important predictor variables of the long-term model are: MatchesPlaying in rank 1, TwitterPopularity in rank 2, LogAcceleration in rank 3, PlayerWorldRanking in rank 4, and TieBreaker in rank 5, that is N=5, and their respective degrees of polynomial ($d_i$) for each predictor function are 5, 1, 2, 1, 2. Then, the new degree of a predictor function for the long-term model is calculated as $$\left\lfloor \frac{1}{15}(5*5+1*4+2*3+1*2+2*1) = \frac{39}{15} \right\rfloor = 2,$$

indicating that the long-term model is replaced by a quadratic model having two (2) as a degree of polynomial value.

In the ensemble, five (5) most important predictor variables of the mid-term model are: LogVelocity in rank 1, LogCount in rank 2, LogAcceleration in rank 3, Top10PlayerImagesPostedToTwitter in rank 4, and SetPlayed in rank 5, that is N=5, and their respective degree of polynomial ($d_i$) for each predictor function are 1, 1, 1, 1, 2. Then, the new degree of a predictor function for the mid-term model is calculated as $$\left\lfloor \frac{1}{15}(1*5+1*4+1*3+1*2+2*1) = \frac{16}{15} \right\rfloor = 1,$$

indicating that the mid-term model is replaced by a linear model having one (1) as a degree of polynomial value.

In the ensemble, five (5) most important predictor variables of the short-term model are: NumberOfErrors in rank 1, NumberOfInjuries in rank 2, NumberOfAces in rank 3, RankOfPlayingTennisPlayers in rank 4, and NumberOfMatches in rank 5, that is N=5, and their respective degree of polynomial ($d_i$) for each predictor function are 4, 2, 3, 3, 3. Then, the new degree of a predictor function for the short-term model is calculated as $$\left\lfloor \frac{1}{15}(4*5+2*4+3*3+3*2+3*1) = \frac{46}{15} \right\rfloor = 3,$$

indicating that the short-term model is replaced by a cubic model having three (3) as a degree of polynomial value.

Equations M1, M2, and M3 are presented for a case of multiple cohort modeling, wherein a first cohort among two cohorts is a multivariate cohort, and a second cohort is univariate cohort. In equations M1, M2, and M3, parameters are identical if previously appeared in FIG. 3A.

Equation M1 indicates that a multivariate target variable Y for the first cohort is represented as a sum of quadratic predictor functions, represented by $E_f$, of two independent variables $E_1(Y|\bar{x}_t)$ and $E_2(Y|\bar{x}_t)$. Both independent variables are respective sum of linear predictor functions determined by predictor variable $\bar{x}_t$, respectively represented by $E_1$ and $E_2$. Equation M2 is identical to Equation EQ133 of FIG. 3A for a linear curve regression function for the long-term prediction model.

Equation M3 indicates that a new model for predictor variables modeled by the multiple cohort modeling is calculated as a weighted combination of two models, for the first cohort and the second cohort, as respectively represented by equations M1 and M2, by use of a normalized weights $\alpha_1$ and $\alpha_2$, wherein $\alpha_1+\alpha_2=1$. In one embodiment of the present invention, alphas, $\alpha_1$ and $\alpha_2$, are set by a human analyst or set as a relative contribution of sum of squares for relative errors associated with the alphas.

Equation M4 of FIG. 3B shows how to calculate a new degree of predictor function as an average of degrees boosted by rank of each predictor variable in case for the second cohort including predictor variables of lower ranks, resulting from a mathematical floor for a sum of $d_i(N-(r_i-1))$ divided by a sum of $r_i$, from j to N, wherein $d_i$, N, and $r_i$ are identical to the U1, and j is the highest rank of the second cohort. In one embodiment of the present invention, for top two predictor variables in the first cohort, boosting is not used but a new degree is calculated as a mathematical average. For example, when five most important predictor variable and associate predictor functions, N=5, from rank 1 to rank 5, are given as Matches playing, Twitter popularity, Log acceleration, Player world ranking, and Tie breaker, and their respective degree of polynomial ($d_i$) in predictor functions associated with each predictor variable are 3, 1, 2, 1, 2, then for a first cohort of top two predictor variables, the new degree of polynomial of the predictor function associated with the top two predictor variables is calculated as a mathematical average of the degrees, $$\left\lfloor \frac{1}{2}(3+1) \right\rfloor = 2,$$

and for a second cohort of three predictor variables the new degree of a predictor function associated with the three predictor variables in ranks 3, 4, and 5, is calculated as a boosted average of the degrees, $$\left\lfloor \frac{1}{3+4+5}(2*3+1*2+2*1) = \frac{10}{12} \right\rfloor = 0$$

No further details on linear regression will be discussed in this specification.

FIGS. 4A, 4B, 4C, 5A, 5B, 6A, and 6B depict an example of the prediction model ensemble 130 as created by the prediction modeling engine 150 of FIG. 1. As noted, heuristics based on observation dictates that even though a cubic model and a quadratic model technically perform better in forecasting for a shorter term than a linear model, taking relative importance in forecasting influence of long-term predictor variables into account, the linear model matches closer to a long-term trend of actual events, and consequently evaluated as a better forecasting model then the quadratic/cubic models.

FIGS. 4A, 4B and 4C depict an example of a linear prediction model of the prediction model ensemble 130, in accordance with one or more embodiments set forth herein.

In FIG. 4A, a first segment for the linear prediction model in lines 401 through 418 is an example of block 291, where the prediction modeling engine 150 creates the linear prediction model of the prediction model ensemble 130. The first segment is a listing in R language, assigning, by use of operator "←", a variable linearModel with a result of function lm( ) having arguments of Label and data, wherein lm( ) generates a first linear model for Label by use of data. A first argument Label, as separated by "~", is a sum of 18 predictors, a first predictor HistoricalMatchFactorPipe from line 401 indicating historical match popularity from Tweets®, a second predictor HistoricalMatchFactorPipekurtosis from line 402 indicating the kurtosis of historical match popularity from Tweets, a third predictor HistoricalMatchFactorPipemean from line 403 indicating the mean of historical match popularity from Tweets, a fourth predictor HistoricalMatchFactorPipenorm from line 404 indicating the normal of historical match popularity from Tweets, a fifth predictor HistoricalMatchFactorPipeskew from line 405 indicating the skew of historical match popularity from Tweets, a sixth predictor HistoricalMatchFactorPipesum from line 406 indicating the sum of historical match popularity from Tweets, a seventh predictor MatchPlayFactorPipe from line 407 indicating the number of tennis matches in play, an eighth predictor TennisLogRealTimeFactorPipeacceleration from line 408 indicating the acceleration of machine access log data, a ninth predictor TennisLogRealTimeFactorPipevelocity from line 409 indicating the velocity of machine access log data, a tenth predictor TennisTwitterCountFactorPipe from line 410 indicating the number of Tweets over a period of time, an eleventh predictor TennisTwitterCountFactorPipeacceleration from line 411 indicating the acceleration of the number of Tweets over a period of time, a twelfth predictor TennisTwitterCountFactorPipevelocity from line 412 indicating the velocity of the number of Tweets over a period of time, a thirteenth predictor TwitterMatchFactorPipeaverage from line 413 indicating the average count of the number of Tweets over a period of time, a fourteenth predictor TwitterMatchFactorPipekurtosis from line 414 indicating real time kurtosis of Twitter popularity of a match, a fifteenth predictor TwitterMatchFactorPipemax from line 415 indicating real time Twitter max popularity of a match, a sixteenth predictor TwitterMatchFactorPipeskew from line 416 indicating real time skew of Twitter popularity of a match, a seventeenth predictor TwitterMatchFactorPipesum from line 417 indicating real time sum of Twitter popularity of a match, and an eighteenth predictor TennisLogRealTimeFactorPipecount from line 418 indicating real time number of log accesses. (Tweet is a registered trademark of Twitter, Inc., in the United States and other countries)

A second argument data is instantiated with a set of data identified as "usta2013train", indicating data from the United States Tennis Association (USTA) tournaments in year 2013, not shown in this specification. Operator "=" from line 418 is the assignment of a variable within a function. The predictors are used to train coefficient vectors of respective prediction models that will regress on the argument Label or the popularity of a tournament, as the Label represents a number of server hits, and the predictors from lines 401 through 418 respectively contribute to forecast the Label as formulated.

In FIG. 4B, a second segment for the linear prediction model in lines 431 through 434 is a portion of an exemplary result of block 292, where the prediction modeling engine 150 checks soundness of the linear model from block 291. Multiple R-squared: 0.879 in line 431 indicates the fit of a model with respect to the explained variance over the unexplained variance. Adjusted R-squared: 0.879 in line 432 indicates that adding predictors does not significantly change the r-squared value. F-statistic: 6.02e+03 on 18 and 14911 DF in line 433 indicates that a variability within predictors is low whereas a variability between predictors is high. p-value: <2e-16 in line 434 indicates the model is significant or does not agree with the null hypothesis.

In FIG. 4B, a third segment for the linear prediction model in line 435 is a portion of block 292 of FIG. 2C, checking soundness of the linear model. Function cv.lm( ), represented also in R language, is to perform a 4-fold cross validation on the training data represented by a first argument usta2013train, for a model represented by a second argument linearModel as built in FIG. 4A. A third argument 4 indicates a number of folds for the cross-validation, meaning data usta2013train is divided into four (4) subgroups for four separate validations.

In FIG. 4C, a graph resulting from cv.lm(usta2013train, linearModel, 4) of line 435 is shown, in which "Predicted (fit to all data)" on x-axis indicates a predicted number of server hits as predicted by the linearModel, and "Label" on y-axis indicates an actual number of server hits as represented in data usta2013train. A data point in Fold 1 is depicted as a triangle, a data point in Fold 2 is depicted as a plus sign, a data point in Fold 3 is depicted as an x mark, and a data point in Fold 4 is depicted as a diamond shape. The graph shows a relative fit of the predictive model given by a prediction on the x-axis to the actual number on the y-axis.

Referring back to FIG. 4B, a fourth segment for the linear prediction model in lines 436 through 439 is an exemplary result of block 293 of FIG. 2C. sum of squares=1.53e+11 in line 436 indicates an explained error, being defined as the sum of squared differences of each observation from the overall mean, for all observations, in statistical analysis. Mean square=41069254 in line 437 indicates the square of the average error or 6,408 server hits. n=3732 in line 438 indicates a number of test cases. 6408 hits per minute, 18% from average label in line 439 indicates the performance of the linearModel under 4 fold cross-validation.

In FIG. 4B, a fifth segment for the linear prediction model in lines 441 through 447 is shown. A first part in lines 441 through 445 is an example of block 293, where the prediction modeling engine 150 calculates the MAPE value for the linear prediction model 133 of the prediction model ensemble 130. In line 441, linearModelPredict is assigned with a result from function predict( ) having a first argument linearModel and a second argument usta2013test indicating a separate data set distinctive from the training data usta2013train, arguments as described in FIG. 4A, to independently test the linearModel. mape=NULL in line 442 assigns NULL value to a variable mape to initialize mape with no bias in the beginning. for loop in lines 443 through 445 calculates mape [i] by repeatedly calculating percentage error. A named value length in line 443 means a total number of samples, a variable i in for loop is assigned to uniquely identify respective sample, referred to as i-th sample. Variable linearModelPredict in line 443 is used to retrieve a predicted value. Function abs( ) in line 444 is used to obtain an absolute value or magnitude of argument (usta2013test$Label[i]−linearModelPredict[i])/ usta2013test$Label[i], that is respective difference between a test data value for the i-the sample (usta2013test$Label [i]) and a predicted value for the i-the sample (linearModelPredict [i]) divided by the test data value for the i-the sample (usta2013test$Label [ i]). Operator "S" from line 444 is used to extract or replace parts, the i-th sample in the example, of the data object usta2013test.

Variable usta2013test$Label [i] in line 444 is to retrieve a data point for the i-th sample from the test data. In lines 446 and 447, the result of lines 441 through 445 is presented as mean (mape) 0.293 indicating the mean absolute percent error (MAPE) for i-th sample.

FIGS. 5A and 5B depict an example of a quadratic prediction model 135 of the prediction model ensemble 130, in accordance with one or more embodiments set forth herein.

In FIG. 5A, a first segment for the quadratic prediction model in lines 501 through 518 is an example of block 291, where the prediction modeling engine 150 creates the quadratic prediction model of the prediction model ensemble 130. The first segment is a listing in R language, assigning a variable quadModel of with a result of function lm( ) having arguments of Label and data=usta2013train, such that lm) generates a second linear model for Label by use of data. A first argument Label is a sum of 18 predictor functions poly (arg1, 2, raw=TRUE) to generate an alternative model, where 18 predictors introduced in FIG. 4A respectively appear in place of a first argument arg1 for each poly( ) function in lines 501 through 518, a second argument 2 indicates the highest degree of regression of the polynomial predictor function, and a third argument raw=TRUE indicates that the poly( ) function will use original values of the training data.

In FIG. 5A, a second segment for the quadratic prediction model in lines 531 through 540 shows a result from blocks 292 and 293 for the quadratic model, in terms shown in lines 431 through 434, 436 through 439, and 446 through 447 of FIG. 4B.

In FIG. 5B, a graph resulting from the cross validation of the quadratic prediction model is shown. See description of FIG. 4C for legend.

FIGS. 6A and 6B depict an example of a cubic prediction model 137 of the prediction model ensemble 130, in accordance with one or more embodiments set forth herein.

In FIG. 6A, a first segment for the cubic prediction model in lines 601 through 618 is an example of block 291, where the prediction modeling engine 150 creates the cubic prediction model 137 of the prediction model ensemble 130. The first segment is a listing in R language, assigning a variable cubicModel of with a result of function lm( ) having arguments of Label and data=usta2013train, such that lm( ) generates a third linear model for Label by use of data. A first argument Label is a sum of 18 predictor functions poly (arg1, 3, raw=TRUE) to generate another alternative model, where 18 predictors introduced in FIG. 4A respectively appear in place of a first argument arg1 for each poly( ) function in lines 601 through 618, a second argument 3 indicates the highest degree of regression of the polynomial predictor function, and a third argument raw=TRUE indicates that the poly( ) function will use original values of the training data.

In FIG. 6B, a graph resulting from the cross validation of the cubic prediction model is shown. See description of FIG. 4C for legend.

In the example described in FIGS. 4A, 4B, 4C, 5A, 5B, 6A, and 6B, at the end of block 293 for respective models in the ensemble, the MAPE values for respective model are: 29.3% for linearModel, 13.4% for quadModel, and 14.8% for cubicModel, as shown in lines 446-447 of FIG. 4B, lines 539-540 of FIG. 5B, and lines 638-639 of FIG. 6B. Therefore, based solely on the MAPE values, the quadratic model seems the most accurate amongst all models in the ensemble. However, as noted earlier, because predictors having more relative importance than other predictors are often linear, the prediction modeling engine looks into relative importance of all predictors.

FIG. 7A is an exemplary ranking of 18 predictors in the example of FIGS. 4A, 4B, 4C, 5A, 5B, 6A, and 6B, resulting from block 294 for the first linear model linearModel, in accordance with one or more embodiments set forth herein. Left column of lines 901 through 918 represents the 18 predictors/predictor variables as introduced in FIG. 4A. Right column of lines 901 through 918 represents respective relative importance of the 18 predictors. The eighteenth predictor TennisLogRealTimeFactorPipecount from line 918 has associated relative importance value 0.32297 that is the greatest among all relative importance values, and the eighteenth predictor is referred to as a top predictor hereinafter. The relative importance for respective predictor variables are normalized, thus a sum of relative importance for all predictor variables is equal to one (1). In cases of quadModel and cubicModel, respective relative importance for predictor variables is similar to FIG. 7A, and will not be separately presented in this specification.

FIG. 7B depicts graphical distribution of the top predictor TennisLogRealTimeFactorPipecount, as determined from the ranking of FIG. 7A, in accordance with one or more embodiments set forth herein. "Label" on x-axis indicates an actual number of server hits as represented in data usta2013train, and "TennisLogRealTimeFactorPipecount" on y-axis indicates the top predictor values for a predicted number of real time log counts.

FIGS. 8A and 8B depict a listing for curve fitting utilizing various functions for the top ranked predictor TennisLogRealTimeFactorPipecount, and various curves resulting from the curve fitting of FIG. 8A for the top predictor, respectively, in accordance with one or more embodiments set forth herein.

The curve fitting in FIG. 8A utilizes eight curve fitting functions in R language for the top ranked predictor TennisLogRealTimeFactorPipecount, or the top predictor, which has the greatest value for relative importance amongst 18 predictors, as a sum of a series of functions presented in lines 801 through 808. In FIG. 8B, "Label" on x-axis an actual number of server hits as represented in data usta2013train, or a prediction rendered by the linearModel that is identical to the actual data, and "TennisLogRealTimeFactorPipecount" on y-axis indicates the top predictor values for a predicted number of real time log counts.

Function ggplot( ) in line 801 takes arguments of usta2013train and aes(x=Label, y=TennisLogRealTimeFactorPipecount) to produce a plot to show error, measured as difference between the predicted value and actual value. A first argument usta2013train indicates the training data as from previous figures. A second argument of ggplot( ) in line 801, Function aes( ) takes a first argument x=Label indicating an actual data and a second argument y=TennisLogRealTimeFactorPipecount indicating a predicted number of server hits or predicted value to visualize respective models, resulting in respective graphical representation, also referred to as aesthetic mappings, as shown in FIG. 8B.

Function geom_point (size=5) in line 802 indicates the size of points as depicted in a graph, that is a scatter diagram, or scatterplot. The points in the scatterplot are identically distributed as shown in FIG. 7B, but were removed from FIG. 8B to clearly show respective curves rendered by stat_smooth( ) functions in lines 803 through 808.

Function stat_smooth (method="lm", formula=y~x, size=1, se=FALSE, colour="purple") in line 803 adds a smoother to determine the aesthetics of a curve including a linear-shaped graph for the scatterplot of geom_point( ) in order to visualize patterns in an overplotted scatterplot, by linear smoothing (method="lm") for a model, or a formula (formula=y~x) into a colored curve (colour="purple"). A first curve resulting from stat_smooth( ) in line 803 is PURPLE curve in FIG. 8B, which mostly overlaps with RED & BLUE curve, indicating the two models, y~x, shown as PURPLE curve, and y~I(1/x) or y~I(1/x*a)+b*x, shown as RED&BLUE curve are discernable. The color-coded curves depict the fit of each model to the data for model selection.

Function stat_smooth(stat_smooth(method="lm", formula=y~I(1/x), size=1, se=FALSE, colour="blue") in line 804 results in an inverse-linear graph. A second curve resulting from stat_smooth( ) in line 804 is RED & BLUE curve in FIG. 8B.

Function stat_smooth(method="lm", formula=y~log(x), size=1, se=FALSE, colour="yellow") in line 805 results in a log graph. A third curve resulting from stat_smooth( ) in line 805 is GREEN & YELLOW curve in FIG. 8B.

Function stat_smooth(stat_smooth(method="nls", formula=y~I(1/x*a)+b*x, data=usta2013train, start=list (a=0,b=0), size=1, se=FALSE, colour="red") in line 806 results in an inverse-linear graph, shown as RED & BLUE curve of FIG. 8B, by use of nonlinear least-squares estimate smoothing (method="nls").

Function stat_smooth(method="nls", formula=y~(a+ b*log(x)), data=usta2013train, start=setNames(coef(lm (TennisLogRealTimeFactorPipecount-log (Label), data=usta2013train)), c("a", "b")), size=1, se=FALSE, colour="green") in line 807 results in a linear log graph, shown as GREEN & YELLOW curve of FIG. 8B.

Function stat_smooth(method="nls", formula=y~I(1/ x*a)+b, data=usta2013train, start=list(a=0,b=0), size=1, se=FALSE, colour="orange") in line 808 results in an inverse linear log graph, shown as ORANGE curve in FIG. 8B.

FIG. 8C is an exemplary listing for AIC calculation, in accordance with one or more embodiments set forth herein.

Lines 811 through 823 assigns a result from list( . . . ) to a variable models that maintains a list of models created with lm( ), or linear mode, and nls( ), or nonlinear least squares, in preparation of a first argument for ldply( ) in line 826.

In line 825, function library ( . . . ) takes arguments of packages to calculate the Akaike Information Criterion (AIC). In line 825, parameter AICcmodag indicates a library to support AIC, parameter plyr indicates a library for splitting lists, and parameter stringr indicates a library for vector parsing.

In line 826, function ldply( ) takes arguments of models and a function( . . . ) to split a list models, apply a function function( . . . ) and return results of each AIC metric. All models in the list of models as prepared from lines 811 through 823 may be individually manipulated by the function ldply( ).

In line 827, function function( ) takes arguments of data frames to calculate the AIC. "data.frame( . . . )" defines the format of an output from function(mod). The method creates a data frame, or a row in a table, for each model that shows the AICc, AIC, and the model equation. Term "data frame" in R language is used for storing data tables, indicating a list of vectors of equal lengths. A first argument of data. frame( ) in line 827, AICc, is a parameter that holds the second order AIC value that has been returned from a library function AICc( ), indicating AIC with a correction for finite sample sizes, giving a greater penalty for overfitting/extra parameters than the AIC. A second argument of data. frame( ) in line 828, AIC, is a parameter that holds the Akaike Information Criterion (AIC) value that has been returned from a library function AIC( ). As noted, the AIC value is used to determine the best model with respect to the goodness of fit and model complexity. Finally, a third argument of data.frame( ) in line 829, model, is a list of models that are fit to a selection of data, in a string representation of the equation that defines each model as function deparse( ) takes unevaluated arguments and converts the unevaluated arguments into the string representation. In line 829, function formula( ) takes arguments mod of formulae then extend the argument formulae for use in the deparse( ) method. An argument mod indicates each element, or component model, within the list of models, models, of line 811

FIG. 8D depicts a result from listing of FIG. 8C, in accordance with one or more embodiments set forth herein.

In lines 831 through 838, AICc value and AIC value associated with respective model of 8 tested models are displayed. The AIC values of the eight curves indicates that a linear model is superior in annealing drift from tested prediction models. The curve fit in line 806 of FIG. 8A, generating the second curve labeled RED & BLUE from FIG. 8B has the least AIC value of 400714.3, thus the prediction modeling engine selects model "I(1/Label*a)+ b*Label" for the top predictor variable TennisLogRealTime-FactorPipecount.

Figure 9:
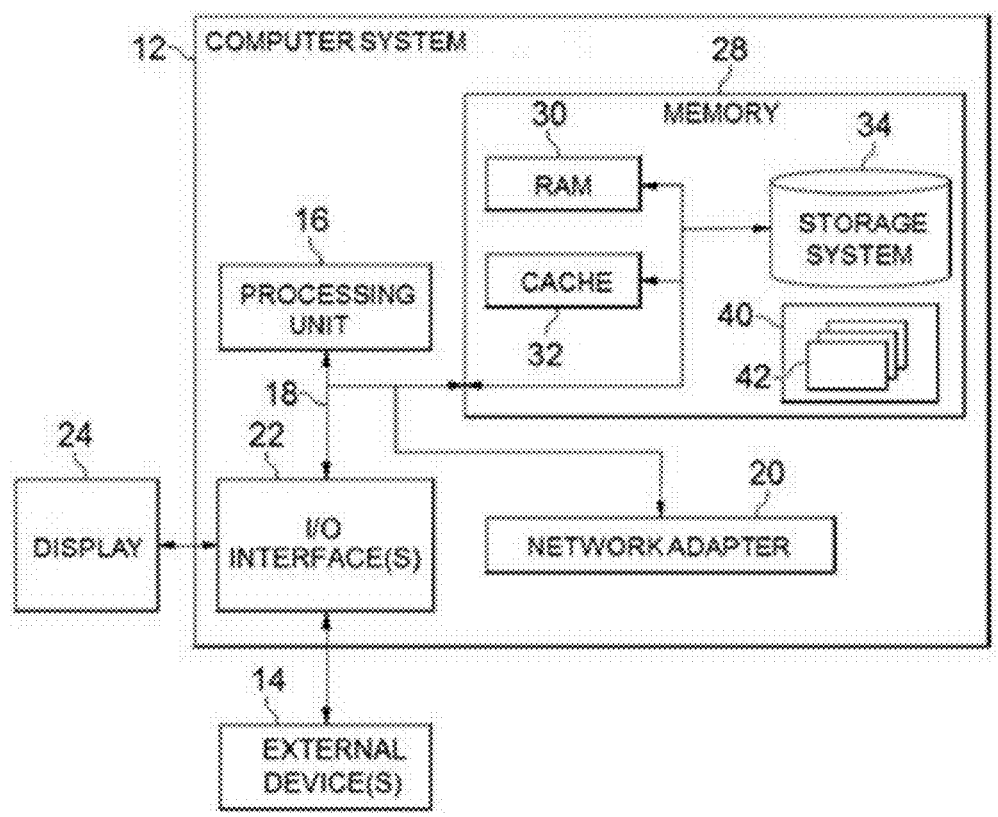
FIG. 9 depicts a cloud computing node according to an embodiment of the present invention.
Figure 10:
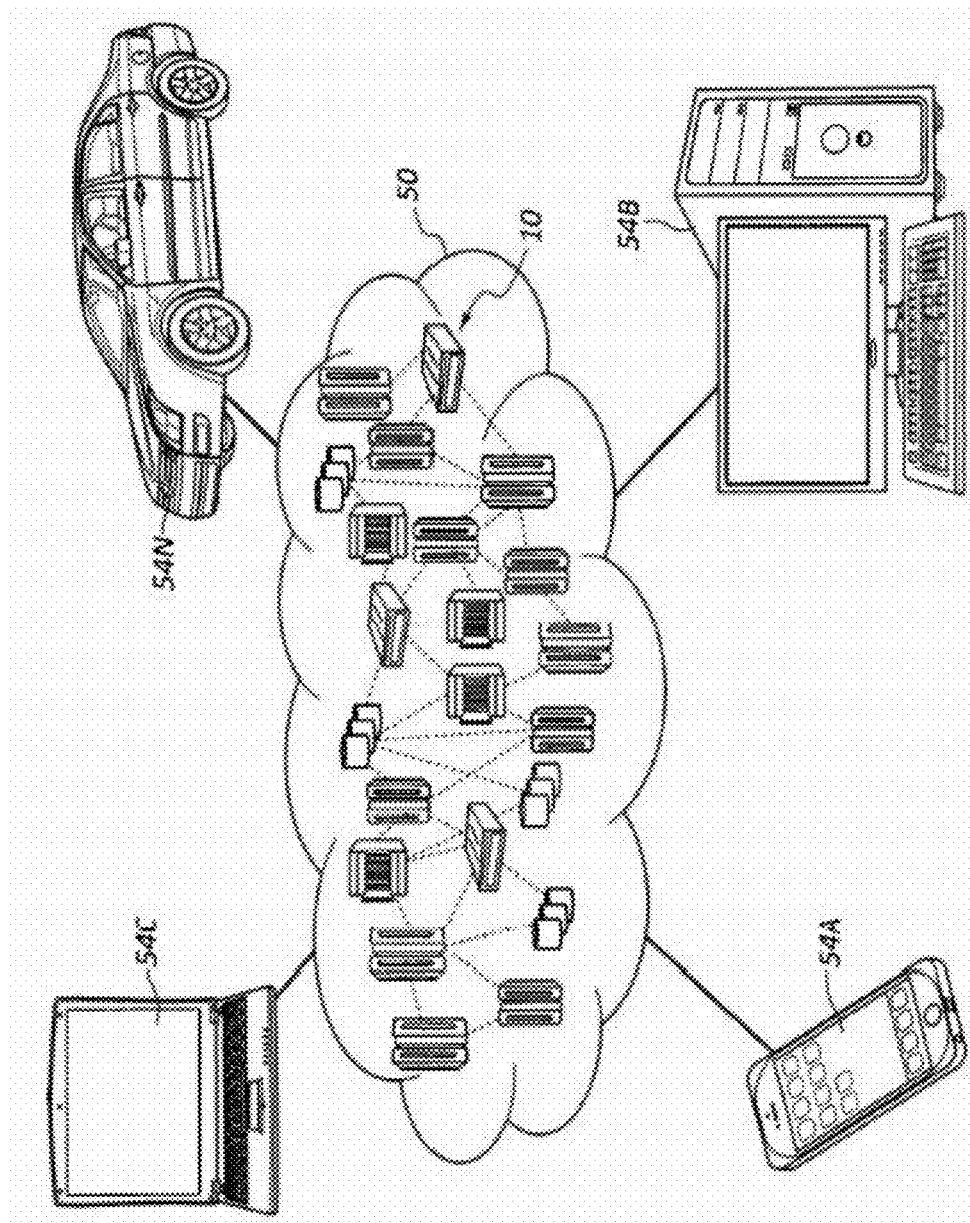
FIG. 10 depicts a cloud computing environment according to an embodiment of the present invention.
Figure 11:
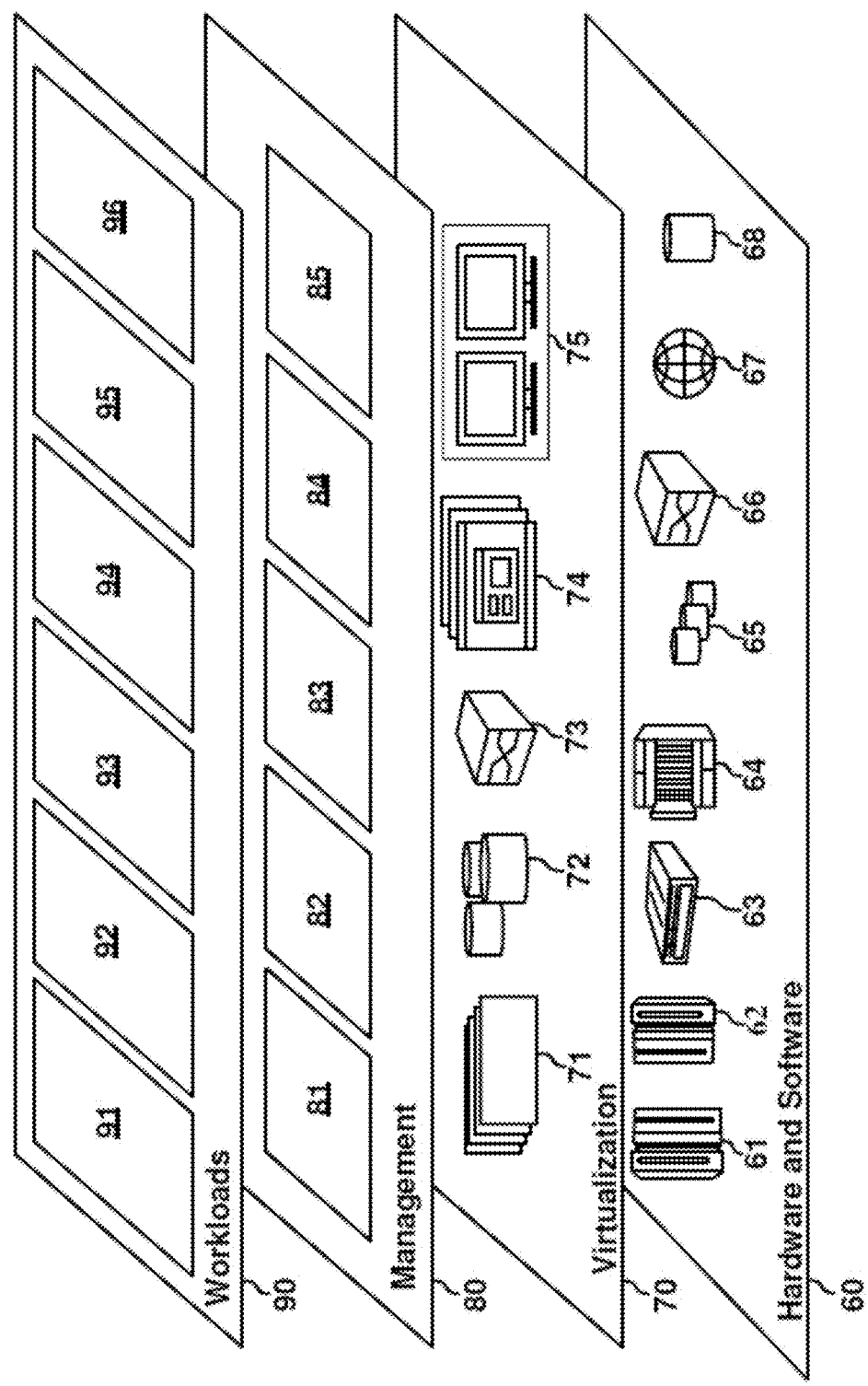
FIG. 11 depicts abstraction model layers according to an embodiment of the present invention.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a drift annealing time series prediction system. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various processing components of a drift annealing time series prediction system 96 as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method for generating a drift annealed time series prediction model based on training data, comprising:

determining that the drift annealed time series prediction model is formulated for a first cohort of at least one predictor variable according to a first input obtained by a computer;

creating and recording an ensemble of candidate models for at least one predictor variable of the training data, in a memory of a computer, the ensemble comprising a first candidate model, a second candidate model, and a third candidate model, wherein the first candidate model is represented by a linear prediction function, the second candidate model is represented by a quadratic prediction function, and the third candidate model is represented by a cubic prediction function, and wherein the linear prediction function is for long-term forecasting, the quadratic prediction function is for mid-term forecasting, and the cubic prediction function is for short-term forecasting, and wherein the training data comprises instances of said at least one predictor variable and a target variable having a predictive relationship with said at least one predictor variable;

creating and recording a new ensemble of new models in the memory, the new ensemble comprising a first new model, a second new model, and a third new model, wherein the respective new models result from calculating respective new degrees for each candidate model of the ensemble such that respective new models take relative importance of predictor variables into account, wherein the first new model is created by calculating a first new degree for the first candidate model, the first new degree resulting from $$\left\lfloor \frac{1}{\sum N} \sum_{i=1}^{N} d_i(N - (r_i - 1)) \right\rfloor$$

that is, a mathematical floor for a first sum of $d_i(N-(r_i-1))$ divided by a second sum of N, wherein $d_i$ indicates a degree of a polynomial of a prediction function corresponding to i-th predictor variable of the first candidate model, wherein N indicates a total number of predictor variables in the first candidate model, and wherein $r_i$ indicates a respective rank of said i-th predictor variable in the first candidate model such that said i-th predictor variable with a smaller value of $r_i$, indicating a rank higher than other predictor variable, weighs more in the first new degree, wherein the second new model is created by calculating a second new degree for the second candidate model, the second new degree resulting from $$\left\lfloor \frac{1}{\sum N} \sum_{i=1}^{N} d_i(N - (r_i - 1)) \right\rfloor$$

that is, a mathematical floor for a second sum of $d_i(N-(r_i-1))$ divided by a second sum of N, wherein $d_i$ indicates a degree of a polynomial of a prediction function corresponding to i-th predictor variable of the second candidate model, wherein N indicates a total number of predictor variables in the second candidate model, and wherein $r_i$ indicates a respective rank of said i-th predictor variable in the second candidate model such that said i-th predictor variable with a smaller value of $r_i$, indicating a rank higher than other predictor variable, weighs more in the second new degree, and wherein the third new model is created by calculating a third new degree for the third candidate model, the third new degree resulting from $$\left\lfloor \frac{1}{\sum N} \sum_{i=1}^{N} d_i(N - (r_i - 1)) \right\rfloor$$

that is, a mathematical floor for a third sum of $d_i(N-(r_i-1))$ divided by a third sum of N, wherein $d_i$ indicates a degree of a polynomial of a prediction function corresponding to i-th predictor variable of the third candidate model, wherein N indicates a total number of predictor variables in the third candidate model, and wherein $r_i$ indicates a respective rank of said i-th predictor variable in the third candidate model such that said i-th predictor variable with a smaller value of $r_i$, indicating a rank higher than other predictor variable, weighs more in the third new degree;

instantiating the drift annealed time series prediction model with the recorded new ensemble; and sending, to an output device of the computer, the drift annealed time series prediction model, such that the drift annealed time series prediction model is utilized for forecasting accurately in the future without drifts.

2. The method of claim 1, said creating the ensemble comprising:

creating the first candidate model represented by the linear prediction function by use of machine learning with the training data, wherein the first candidate model predicting the target variable Y as the linear prediction function of said at least one predictor variable $\bar{x}_t$ is formulated as $$E(Y|\bar{x}_t) = \sum_{1}^{|\bar{x}|} (\beta_i x_{ti} + \varepsilon_i), i = 1, \ldots, |\bar{x}|,$$

wherein $|\bar{x}|$ is a positive integer indicating the number of predictor variables in the ensemble, wherein a first term of the first candidate model $\beta_i x_{ti}$ is a respective inner product between an i-th predictor variable vector $x_{ti}$ and an i-th coefficient vector $\beta_i$, and wherein a second term of the first candidate model $\varepsilon_i$ is a noise vector;

creating the second candidate model represented by the quadratic prediction function by use of machine learning with the training data, wherein the second candidate model predicting the target variable Y as the quadratic prediction function of said at least one predictor variable $\bar{x}_t$ is formulated as $E(Y|\bar{x}_t)=\sum_{1}^{|\bar{x}|}(\beta_{i2}x_{ti}^2+\beta_{i1}x_{ti}+\beta_{i0})$ i=1, . . . , $|\bar{x}|$, in wherein a first term of the second candidate model $\beta_{i2}x_{ti}^2$ is a respective inner product between the square of an i-th predictor variable $x_{ti}^2$ and an i-th coefficient vector $\beta_{i2}$ corresponding to $x_{ti}^2$, wherein a second term of the second candidate model $\beta_{i1}x_{ti}$ is a respective inner product between an i-th linear predictor variable $x_{ti}$ and an i-th coefficient vector $\beta_{i1}$ corresponding to the i-th linear $x_{ti}$, and a third term of the second candidate model $\beta_{i0}$ is a respective constant coefficient vector for each i-th predictor variable; and creating the third candidate model represented by the cubic prediction function by use of machine learning with the training data, wherein the third candidate model predicting the target variable Y as the cubic prediction function of said at least one predictor variable $\bar{x}_t$ is formulated as $$E(Y \mid \bar{x}_t) = \sum_{1}^{|\bar{x}|} (\beta_{i3} x_{ti}^3 + \beta_{i2} x_{ti}^2 + \beta_{i1} x_{ti} + \beta_{i0}), i = 1, \ldots, |\bar{x}|,$$

wherein a first term of the third candidate model $\beta_{i3} x_{ti}^3$ is a respective inner product between the third power of an i-th predictor variable $x_{ti}^3$ and an i-th coefficient vector $\beta_{i2}$ corresponding to $x_{ti}^3$, wherein a second term of the third candidate model $\beta_{i2} x_{ti}^2$ is a respective inner product between the square of an i-th predictor variable $x_{ti}^2$ and an i-th coefficient vector $\beta_{i2}$ corresponding to $x_{ti}^2$, wherein a third term of the third candidate model $\beta_{i1} x_{ti}$ is a respective inner product between an i-th linear predictor variable $x_{ti}$ and an i-th coefficient vector $\beta_{i1}$ corresponding to the i-th linear $x_{ti}$, and a fourth term of the third candidate model $\beta_{i0}$ is a respective constant coefficient vector for each i-th predictor variable.

3. The method of claim 1, further comprising:
dividing, prior to said recording the ensemble of candidate models, said at least one predictor variable into a selected number of cohorts according to the first input obtained by the computer, wherein the selected number is obtained from the first input;
iterating, for each cohort of the selected number of cohorts, said creating and recording the ensemble for a respective group of predictor variables belonging to said each cohort, and said creating and recording the new ensemble for the respective group of predictor variables belonging to said each cohort;
creating and recording a cross-cohort ensemble in the memory, the cross-cohort ensemble comprising a first cross-cohort model, a second cross-cohort model, and a third cross-cohort model, wherein the first cross-cohort model is a first weighted combination of the selected number of first new models respective to said each cohort, the second cross-cohort model is a second weighted combination of the selected number of second new models respective to said each cohort, and the third cross-cohort model is a third weighted combination of the selected number of third new models respective to said each cohort, wherein respective weights for said each cohort are normalized to represent respective contributions of said each cohort to said at least one predictor variable; and
prior to said sending, instantiating the drift annealed time series prediction model with the recorded cross-cohort ensemble.

4. The method of claim 3, wherein the selected number of cohorts is two (2), wherein a first cohort of the two cohorts comprises highest ranked predictor variables having respective smallest rank values, and wherein a second cohort of the two cohorts comprises the rest of predictor variables having respective largest rank values.

5. The method of claim 4, said iterating comprising:
creating and recording a first cohort ensemble associated with the first cohort, the first cohort ensemble comprising a first candidate model of the first cohort ensemble, a second candidate model of the first cohort ensemble, and a third candidate model of the first cohort ensemble, respectively, for predictor variables of the first cohort;
creating and recording a first new cohort ensemble associated with the first cohort, the first new cohort ensemble for the predictor variables of the first cohort comprising a first new candidate model of the first new cohort ensemble, a second new candidate model of the first new cohort ensemble, and a third new candidate model of the first new cohort ensemble for the first cohort, respectively from the first candidate model, the second candidate model, and the third candidate model for the first cohort, by calculating, respectively, a first new degree, a second new degree, and a third new degree for respective candidate models for the first cohort, respective new degree resulting from a respective mathematical average of degrees of respective prediction function associated with respective candidate models of the first ensemble;
creating and recording a second cohort ensemble associated with the second cohort comprising a first candidate model of the second cohort ensemble, a second candidate model of the second cohort ensemble, and a third candidate model of the second cohort ensemble, respectively, for predictor variables of the second cohort;
creating and recording a second new cohort ensemble associated with the second cohort for-the predictor variables of the second cohort, the second new cohort ensemble comprising a first new candidate model of the second new cohort ensemble, a second new candidate model of the second new cohort ensemble, and a third new candidate model of the second new cohort ensemble for the second cohort, respectively from the first candidate model, the second candidate model, and the third candidate model of the second cohort ensemble for the second cohort, by calculating, respectively, a first new degree, a second new degree, and a third new degree for respective candidate models for the second cohort, respective new degree resulting from $$\left\lfloor \frac{1}{\sum_{i=j}^{N} r_i} \sum_{i=j}^{N} d_i (N - (r_i - 1)) \right\rfloor,$$

that is, a respective mathematical floor for a respective sum of $$d_i(N - (r_i - 1))$$

divided by a respective sum of $r_i$, from j to N, wherein j is the highest rank and having the smallest rank value in the second cohort, wherein $d_i$ indicates a degree of a polynomial of a prediction function corresponding to i-th predictor variable of the respective candidate models, wherein N indicates a respective total number of predictor variables in the respective candidate models, and wherein $r_i$ indicates a respective rank of said i-th predictor variable in the respective candidate models such that said i-th predictor variable with a smaller value of $r_i$ amongst the predictor variables in the second cohort, indicating a rank higher than other predictor variable in the second cohort, weighs more in the respective new degree.

6. The method of claim 1, said creating the ensemble comprising:
evaluating and recording soundness measurements, respective to the first candidate model, the second candidate model, and the third candidate model, wherein the respective candidate models are evaluated against the training data to see if respective candidate models properly models the training data, wherein the soundness measurements are R squared values and cross-validation results respectively associated with the first candidate model, the second candidate model, and the third candidate model;
calculating and recording accuracy measurements, respective to the first candidate model, the second candidate model, and the third candidate model, wherein Mean Absolute Percentage Error (MAPE) values are calculated for the respective candidate models by running test data distinctive from the training data; and
calculating a rank of the relative importance of predictor variables for respective candidate models.

7. The method of claim 6, said creating the ensemble further comprising:
trying a plurality of curve fit equations, in place of respective prediction functions associated with respective candidate models, for said at least one predictor variables against the test data;
calculating respective Akaike Information Criterion (AIC) values for each one of the plurality of curve fit equations; and
selecting a best fit equation from the plurality of curve fit equations having a smallest AIC value.

8. The method of claim 7, wherein the plurality of curve fit equations comprise "y~x", "y~I(1/x)", "y~log(x)", "y~I (1/x*a)+b*x", "

$$y \sim (a + b * \log(x))$$

and "y~I(1/x*a)+b" in context of R language expression.

9. A computer program product comprising:
a computer readable storage medium readable by one or more processor and storing instructions for execution by the one or more processor for performing a method for generating a drift annealed time series prediction model based on training data, comprising:
determining that the drift annealed time series prediction model is formulated for a first cohort of at least one predictor variable according to a first input obtained by a computer;
creating and recording an ensemble of candidate models for at least one predictor variable of the training data, in a memory of a computer, the ensemble comprising a first candidate model, a second candidate model, and a third candidate model, wherein the first candidate model is represented by a linear prediction function, the second candidate model is represented by a quadratic prediction function, and the third candidate model is represented by a cubic prediction function, and wherein the linear prediction function is for long-term forecasting, the quadratic prediction function is for mid-term forecasting, and the cubic prediction function is for short-term forecasting, and wherein the training data comprises instances of said at least one predictor variable and a target variable having a predictive relationship with said at least one predictor variable;
creating and recording a new ensemble of new models in the memory, the new ensemble comprising a first new model, a second new model, and a third new model, wherein the respective new models result from calculating respective new degrees for each candidate model of the ensemble such that respective new models take relative importance of predictor variables into account,
wherein the first new model is created by calculating a first new degree for the first candidate model, the first new degree resulting from $$\left\lfloor \frac{1}{\sum N} \sum_{i=1}^{N} d_i (N - (r_i - 1)) \right\rfloor$$

that is, a mathematical floor for a first sum of $d_i(N-(r_i-1))$ divided by a second sum of N, wherein $d_i$ indicates a degree of a polynomial of a prediction function corresponding to i-th predictor variable of the first candidate model, wherein N indicates a total number of predictor variables in the first candidate model, and wherein $r_i$ indicates a respective rank of said i-th predictor variable in the first candidate model such that said i-th predictor variable with a smaller value of $r_i$, indicating a rank higher than other predictor variable, weighs more in the first new degree,
wherein the second new model is created by calculating a second new degree for the second candidate model, the second new degree resulting from $$\left\lfloor \frac{1}{\sum N} \sum_{i=1}^{N} d_i (N - (r_i - 1)) \right\rfloor$$

that is, a mathematical floor for a second sum of $d_i(N-(r_i-1))$ divided by a second sum of N, wherein $d_i$ indicates a degree of a polynomial of a prediction function corresponding to i-th predictor variable of the second candidate model, wherein N indicates a total number of predictor variables in the second candidate model, and wherein $r_i$ indicates a respective rank of said i-th predictor variable in the second candidate model such that said i-th predictor variable with a smaller value of $r_i$, indicating a rank higher than other predictor variable, weighs more in the second new degree, and
wherein the third new model is created by calculating a third new degree for the third candidate model, the third new degree resulting from $$\left\lfloor \frac{1}{\sum N} \sum_{i=1}^{N} d_i (N - (r_i - 1)) \right\rfloor$$

that is, a mathematical floor for a third sum of $d_i(N-(r_i-1))$ divided by a third sum of N, wherein $d_i$ indicates a degree of a polynomial of a prediction function corresponding to i-th predictor variable of the third candidate model, wherein N indicates a total number of predictor variables in the third candidate model, and wherein $r_i$ indicates a respective rank of said i-th predictor variable in the third candidate model such that said i-th predictor variable with a smaller value of $r_i$, indicating a rank higher than other predictor variable, weighs more in the third new degree;

instantiating the drift annealed time series prediction model with the recorded new ensemble; and sending, to an output device of the computer, the drift annealed time series prediction model, such that the drift annealed time series prediction model is utilized for forecasting accurately in the future without drifts.

10. The computer program product of claim 9, said creating the ensemble comprising:

creating the first candidate model represented by the linear prediction function by use of machine learning with the training data, wherein the first candidate model predicting the target variable Y as the linear prediction function of said at least one predictor variable $\bar{x}_t$ is formulated as $$E(Y|\bar{x}_t) = \sum_{1}^{|\bar{x}|} (\beta_i x_{ti} + \varepsilon_i), i = 1, \ldots, |\bar{x}|,$$

wherein $|\bar{x}|$ is a positive integer indicating the number of predictor variables in the ensemble, wherein a first term of the first candidate model $\beta_i x_{ti}$ is a respective inner product between an i-th predictor variable vector $x_{ti}$ and an i-th coefficient vector $\beta_i$, and wherein a second term of the first candidate model $\varepsilon_i$ is a noise vector;

creating the second candidate model represented by the quadratic prediction function by use of machine learning with the training data, wherein the second candidate model predicting the target variable Y as the quadratic prediction function of said at least one predictor variable $\bar{x}_t$ is formulated as $E(Y|\bar{x}_t) = \Sigma_1^{|\bar{x}|}(\beta_{i2} x_{ti}^2 + \beta_{i1} x_{ti} + \beta_{i0})$, i=1, \ldots, $|\bar{x}|$, in wherein a first term of the second candidate model $\beta_{i2} x_{ti}^2$ is a respective inner product between the square of an i-th predictor variable $x_{ti}^2$ and an i-th coefficient vector $\beta_{i2}$ corresponding to $x_{ti}^2$, wherein a second term of the second candidate model $\beta_{i1} x_{ti}$ is a respective inner product between an i-th linear predictor variable $x_{ti}$ and an i-th coefficient vector $\beta_{i1}$ corresponding to the i-th linear $x_{ti}$, and a third term of the second candidate model $\beta_{i0}$ is a respective constant coefficient vector for each i-th predictor variable; and creating the third candidate model represented by the cubic prediction function by use of machine learning with the training data, wherein the third candidate model predicting the target variable Y as the cubic prediction function of said at least one predictor variable $\bar{x}_t$ is formulated as $$E(Y|\bar{x}_t) = \sum_{1}^{|\bar{x}|} (\beta_{i3} x_{ti}^3 + \beta_{i2} x_{ti}^2 + \beta_{i1} x_{ti} + \beta_{i0}), i = 1, \ldots, |\bar{x}|,$$

wherein a first term of the third candidate model $\beta_{i3} x_{ti}^3$ is a respective inner product between the third power of an i-th predictor variable $x_{ti}^3$ and an i-th coefficient vector $\beta_{i3}$ corresponding to $x_{ti}^3$, wherein a second term of the third candidate model $\beta_{i2} x_{ti}^2$ is a respective inner product between the square of an i-th predictor variable $x_{ti}^2$ and an i-th coefficient vector $\beta_{i2}$ corresponding to $x_{ti}^2$, wherein a third term of the third candidate model $\beta_{i1} x_{ti}$ is a respective inner product between an i-th linear predictor variable $x_{ti}$ and an i-th coefficient vector corresponding to the i-th linear $x_{ti}$, and a fourth term of the third candidate model $\beta_{i0}$ is a respective constant coefficient vector for each i-th predictor variable.

11. The computer program product of claim 9, further comprising:

dividing, prior to said recording the ensemble of candidate models, said at least one predictor variable into a selected number of cohorts according to the first input obtained by the computer, wherein the selected number is obtained from the first input;

iterating, for each cohort of the selected number of cohorts, said creating and recording the ensemble for a respective group of predictor variables belonging to said each cohort, and said creating and recording the new ensemble for the respective group of predictor variables belonging to said each cohort;

creating and recording a cross-cohort ensemble in the memory, the cross-cohort ensemble comprising a first cross-cohort model, a second cross-cohort model, and a third cross-cohort model, wherein the first cross-cohort model is a first weighted combination of the selected number of first new models respective to said each cohort, the second cross-cohort model is a second weighted combination of the selected number of second new models respective to said each cohort, and the third cross-cohort model is a third weighted combination of the selected number of third new models respective to said each cohort, wherein respective weights for said each cohort are normalized to represent respective contributions of said each cohort to said at least one predictor variable; and prior to said sending, instantiating the drift annealed time series prediction model with the recorded cross-cohort ensemble.

12. The computer program product of claim 11, wherein the selected number of cohorts is two (2), wherein a first cohort of the two cohorts comprises highest ranked predictor variables having respective smallest rank values, and wherein a second cohort of the two cohorts comprises the rest of predictor variables having respective largest rank values.

13. The computer program product of claim 11, said iterating comprising:

creating and recording a first cohort ensemble associated with the first cohort, the first cohort ensemble comprising a first candidate model of the first cohort ensemble, a second candidate model of the first cohort ensemble, and a third candidate model of the first cohort ensemble, respectively, for predictor variables of the first cohort;

creating and recording a first new cohort ensemble associated with the first cohort, the first new cohort ensemble for the predictor variables of the first cohort comprising a first new candidate model of the first new cohort ensemble, a second new candidate model of the first new cohort ensemble, and a third new candidate model of the first new cohort ensemble for the first cohort, respectively from the first candidate model, the second candidate model, and the third candidate model for the first cohort, by calculating, respectively, a first new degree, a second new degree, and a third new degree for respective candidate models for the first cohort, respective new degree resulting from a respective mathematical average of degrees of respective prediction function associated with respective candidate models of the first ensemble;

creating and recording a second cohort ensemble associated with the second cohort comprising a first candidate model of the second cohort ensemble, a second candidate model of the second cohort ensemble, and a third candidate model of the second cohort ensemble, respectively, for predictor variables of the second cohort;

creating and recording a second new cohort ensemble associated with the second cohort for-the predictor variables of the second cohort, the second new cohort ensemble comprising a first new candidate model of the second new cohort ensemble, a second new candidate model of the second new cohort ensemble, and a third new candidate model of the second new cohort ensemble for the second cohort, respectively from the first candidate model, the second candidate model, and the third candidate model of the second cohort ensemble for the second cohort, by calculating, respectively, a first new degree, a second new degree, and a third new degree for respective candidate models for the second cohort, respective new degree resulting from $$\left\lfloor \frac{1}{\sum_{i=j}^{N} r_i} \sum_{i=j}^{N} d_i(N - (r_i - 1)) \right\rfloor,$$

that is, a respective mathematical floor for a respective sum of $$d_i(N - (r_i - 1))$$

divided by a respective sum of $r_i$, from j to N, wherein j is the highest rank and having the smallest rank value in the second cohort, wherein $d_i$ indicates a degree of a polynomial of a prediction function corresponding to i-th predictor variable of the respective candidate models, wherein N indicates a respective total number of predictor variables in the respective candidate models, and wherein $r_i$ indicates a respective rank of said i-th predictor variable in the respective candidate models such that said i-th predictor variable with a smaller value of $r_i$ amongst the predictor variables in the second cohort, indicating a rank higher than other predictor variable in the second cohort, weighs more in the respective new degree.

14. The computer program product of claim 9, said creating the ensemble comprising:
evaluating and recording soundness measurements, respective to the first candidate model, the second candidate model, and the third candidate model, wherein the respective candidate models are evaluated against the training data to see if respective candidate models properly models the training data, wherein the soundness measurements are R squared values and cross-validation results respectively associated with the first candidate model, the second candidate model, and the third candidate model;

calculating and recording accuracy measurements, respective to the first candidate model, the second candidate model, and the third candidate model, wherein Mean Absolute Percentage Error (MAPE) values are calculated for the respective candidate models by running test data distinctive from the training data; and calculating a rank of the relative importance of predictor variables for respective candidate models.

15. The computer program product of claim 14, said creating the ensemble further comprising:
trying a plurality of curve fit equations, in place of respective prediction functions associated with respective candidate models, for said at least one predictor variables against the test data;
calculating respective Akaike Information Criterion (AIC) values for each one of the plurality of curve fit equations; and
selecting a best fit equation from the plurality of curve fit equations having a smallest AIC value, wherein the plurality of curve fit equations comprise "y~x", "y~I(1/x)", "

$$y \sim \log(x)$$

"y~I(1/x*a)+b*x", "y~(a+b*log(x))", and "

$$y \sim I(1/x*a) + b$$

in context of R language expression.

16. A system comprising:
a memory;
one or more processor in communication with memory; and
program instructions executable by the one or more processor via the memory to perform a method for generating a drift annealed time series prediction model based on training data, comprising:
determining that the drift annealed time series prediction model is formulated for a first cohort of at least one predictor variable according to a first input obtained by a computer;
creating and recording an ensemble of candidate models for at least one predictor variable of the training data, in a memory of a computer, the ensemble comprising a first candidate model, a second candidate model, and a third candidate model, wherein the first candidate model is represented by a linear prediction function, the second candidate model is represented by a quadratic prediction function, and the third candidate model is represented by a cubic prediction function, and wherein the linear prediction function is for long-term forecasting, the quadratic prediction function is for mid-term forecasting, and the cubic prediction function is for short-term forecasting, and wherein the training data comprises instances of said at least one predictor variable and a target variable having a predictive relationship with said at least one predictor variable;
creating and recording a new ensemble of new models in the memory, the new ensemble comprising a first new model, a second new model, and a third new model, wherein the respective new models result from calculating respective new degrees for each candidate model of the ensemble such that respective new models take relative importance of predictor variables into account, wherein the first new model is created by calculating a first new degree for the first candidate model, the first new degree resulting from $$\left\lfloor \frac{1}{\Sigma N} \sum_{i=1}^{N} d_i(N-(r_i-1)) \right\rfloor$$

that is, a mathematical floor for a first sum of $d_i(N-(r_i-1))$ divided by a second sum of N, wherein $d_i$ indicates a degree of a polynomial of a prediction function corresponding to i-th predictor variable of the first candidate model, wherein N indicates a total number of predictor variables in the first candidate model, and wherein $r_i$ indicates a respective rank of said i-th predictor variable in the first candidate model such that said i-th predictor variable with a smaller value of $r_i$, indicating a rank higher than other predictor variable, weighs more in the first new degree, wherein the second new model is created by calculating a second new degree for the second candidate model, the second new degree resulting from $$\left\lfloor \frac{1}{\Sigma N} \sum_{i=1}^{N} d_i(N-(r_i-1)) \right\rfloor$$

that is, a mathematical floor for a second sum of $d_i(N-(r_i-1))$ divided by a second sum of N, wherein $d_i$ indicates a degree of a polynomial of a prediction function corresponding to i-th predictor variable of the second candidate model, wherein N indicates a total number of predictor variables in the second candidate model, and wherein $r_i$ indicates a respective rank of said i-th predictor variable in the second candidate model such that said i-th predictor variable with a smaller value of $r_i$, indicating a rank higher than other predictor variable, weighs more in the second new degree, and wherein the third new model is created by calculating a third new degree for the third candidate model, the third new degree resulting from $$\left\lfloor \frac{1}{\Sigma N} \sum_{i=1}^{N} d_i(N-(r_i-1)) \right\rfloor$$

that is, a mathematical floor for a third sum of $d_i(N-(r_i-1))$ divided by a third sum of N, wherein $d_i$ indicates a degree of a polynomial of a prediction function corresponding to i-th predictor variable of the third candidate model, wherein N indicates a total number of predictor variables in the third candidate model, and wherein $r_i$ indicates a respective rank of said i-th predictor variable in the third candidate model such that said i-th predictor variable with a smaller value of $r_i$, indicating a rank higher than other predictor variable, weighs more in the third new degree;

instantiating the drift annealed time series prediction model with the recorded new ensemble; and sending, to an output device of the computer, the drift annealed time series prediction model, such that the drift annealed time series prediction model is utilized for forecasting accurately in the future without drifts.

\* \* \* \* \*